US012663275B2

(12) United States Patent
Bhat et al.

(10) Patent No.: US 12,663,275 B2
(45) Date of Patent: Jun. 23, 2026

(54) ENTITY ALLOCATION FOR NAVIGATED ROUTES

(71) Applicant: Intel Corporation, Santa Clara, CA (US)

(72) Inventors: Raghavendra Bhat, Bangalore (IN); Pravin Chander Chandran, Fremont, CA (US); Sean Lawrence, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 148 days.

(21) Appl. No.: 18/338,418

(22) Filed: Jun. 21, 2023

(65) Prior Publication Data

US 2024/0210185 A1     Jun. 27, 2024

(30) Foreign Application Priority Data

Dec. 22, 2022    (IN) ............................. 202241074589

(51) Int. Cl.
      *G01C 21/34*        (2006.01)
      *G01C 21/36*        (2006.01)
(52) U.S. Cl.
      CPC ..... *G01C 21/3461* (2013.01); *G01C 21/3492* (2013.01); *G01C 21/3691* (2013.01)
(58) Field of Classification Search
      CPC ............ G01C 21/3461; G01C 21/3492; G01C 21/3691
      See application file for complete search history.

(56) References Cited

U.S. PATENT DOCUMENTS

| | | | |
|---|---|---|---|
| 2013/0046526 A1* | 2/2013 | Yucel ................. | G01C 21/3469 |
| | | | 703/8 |
| 2015/0285651 A1* | 10/2015 | Cerecke ................ | G06Q 10/04 |
| | | | 701/533 |
| 2016/0334797 A1* | 11/2016 | Ross .................... | G05D 1/0027 |
| 2016/0364823 A1* | 12/2016 | Cao ......................... | G06Q 50/40 |
| 2018/0216952 A1* | 8/2018 | Krumm ............. | G01C 21/3676 |
| 2018/0322775 A1* | 11/2018 | Chase ................ | G01C 21/3438 |
| 2018/0340790 A1* | 11/2018 | Kislovskiy ......... | G01C 21/3484 |
| 2018/0341261 A1* | 11/2018 | Kislovskiy ............. | G06N 20/00 |
| 2018/0364055 A1* | 12/2018 | Laur ................. | G08G 1/096827 |
| 2019/0186936 A1* | 6/2019 | Ebner ................ | G01C 21/3461 |
| 2019/0301877 A1* | 10/2019 | Duale ................ | G01C 21/3484 |

(Continued)

*Primary Examiner* — Abdalla A Khaled
(74) *Attorney, Agent, or Firm* — Banner & Witcoff, Ltd.

(57)              ABSTRACT

Techniques are provided to calculate a "complexity score" (CS) and qualifying allocation score, which aims to address the gap between a performance score, which may represent a driver score of other suitable entity-based performance score. The CS may be calculated based upon the particular agent (e.g. a vehicle, an autonomous mobile robot (AMR), etc.), such as via the use of vehicle-based alerts, other types of alerts, environment-based data, etc., which are collected for specific navigation segments. The CS is then combined with the performance score to provide a qualifying allocation score, which is a context-sensitive view of the performance score. This context-sensitive view of the performance score may then be utilized for a determination regarding how to allocate the most well-suited entity (a driver, vehicle, AMR, etc.) to a subsequent route that includes the navigation segments.

20 Claims, 8 Drawing Sheets

(56) References Cited

U.S. PATENT DOCUMENTS

| | | | |
|---|---|---|---|
| 2020/0200551 A1* | 6/2020 | Fischer | G01C 21/3626 |
| 2020/0200553 A1* | 6/2020 | Voznesensky | B60W 40/06 |
| 2020/0356100 A1* | 11/2020 | Nagarajan | G05D 1/247 |
| 2021/0018323 A1* | 1/2021 | Freedman | G01C 21/3461 |
| 2021/0055720 A1* | 2/2021 | Hayashida | G05D 1/0011 |
| 2021/0381842 A1* | 12/2021 | Nishimura | G08G 1/00 |
| 2022/0003556 A1 | 1/2022 | Lawrence et al. | |
| 2022/0034667 A1* | 2/2022 | Rolf | G01C 21/3889 |
| 2022/0063653 A1* | 3/2022 | Beaurepaire | G01C 21/3453 |
| 2022/0107186 A1* | 4/2022 | Okabe | G01C 21/20 |
| 2022/0236067 A1* | 7/2022 | Dayal | G08G 1/20 |
| 2022/0252415 A1* | 8/2022 | Meroux | G08G 1/20 |
| 2022/0276063 A1* | 9/2022 | Berman | G01C 21/3691 |
| 2022/0351616 A1* | 11/2022 | Kubin | G01C 21/3461 |
| 2023/0127182 A1* | 4/2023 | Mayster | G06V 20/182 |
| | | | 701/423 |
| 2023/0192129 A1* | 6/2023 | Winter | B60W 60/0011 |
| | | | 701/24 |
| 2023/0194285 A1* | 6/2023 | Fowe | G06N 3/02 |
| | | | 701/414 |
| 2023/0408270 A1* | 12/2023 | Moyal | G06F 30/20 |
| 2024/0112077 A1* | 4/2024 | Agrawal | G06N 5/02 |
| 2024/0118096 A1* | 4/2024 | Kundu | B60L 53/12 |

* cited by examiner

100

300

500

| Route Segment | RS1 | | | | RS2 | | | | RS3 | | | | RS4 | | | | RS5 | | | | Total | |
|---|---|---|---|---|---|---|---|---|---|---|---|---|---|---|---|---|---|---|---|---|---|---|
| | RCSbs | RCSds | DS | DSq | RCSbs | RCSds | DS | DSq | RCSbs | RCSds | DS | DSq | RCSbs | RCSds | DS | DSq | RCSbs | RCSds | DS | DSq | DS | DSq |
| Driver X | 103 | 128 | 301 | 361.2 | 109 | 134 | 290 | 348 | 114 | 134 | 289 | 346.8 | 131 | 145 | 341 | 375.1 | 158 | 174 | 390 | 429 | 1611 | 1860.1 |
| Driver Y | 103 | 265 | 250 | 650 | 109 | 290 | 201 | 542.7 | 114 | 250 | 230 | 506 | 131 | 190 | 269 | 403.5 | 158 | 226 | 259 | 362.6 | 1209 | 2464.8 |
| Driver Z | 103 | 96 | 250 | 225 | 109 | 126 | 330 | 396 | 114 | 126 | 350 | 385 | 131 | 119 | 300 | 270 | 158 | 130 | 271 | 216.8 | 1501 | 1492.8 |

Figure 7:
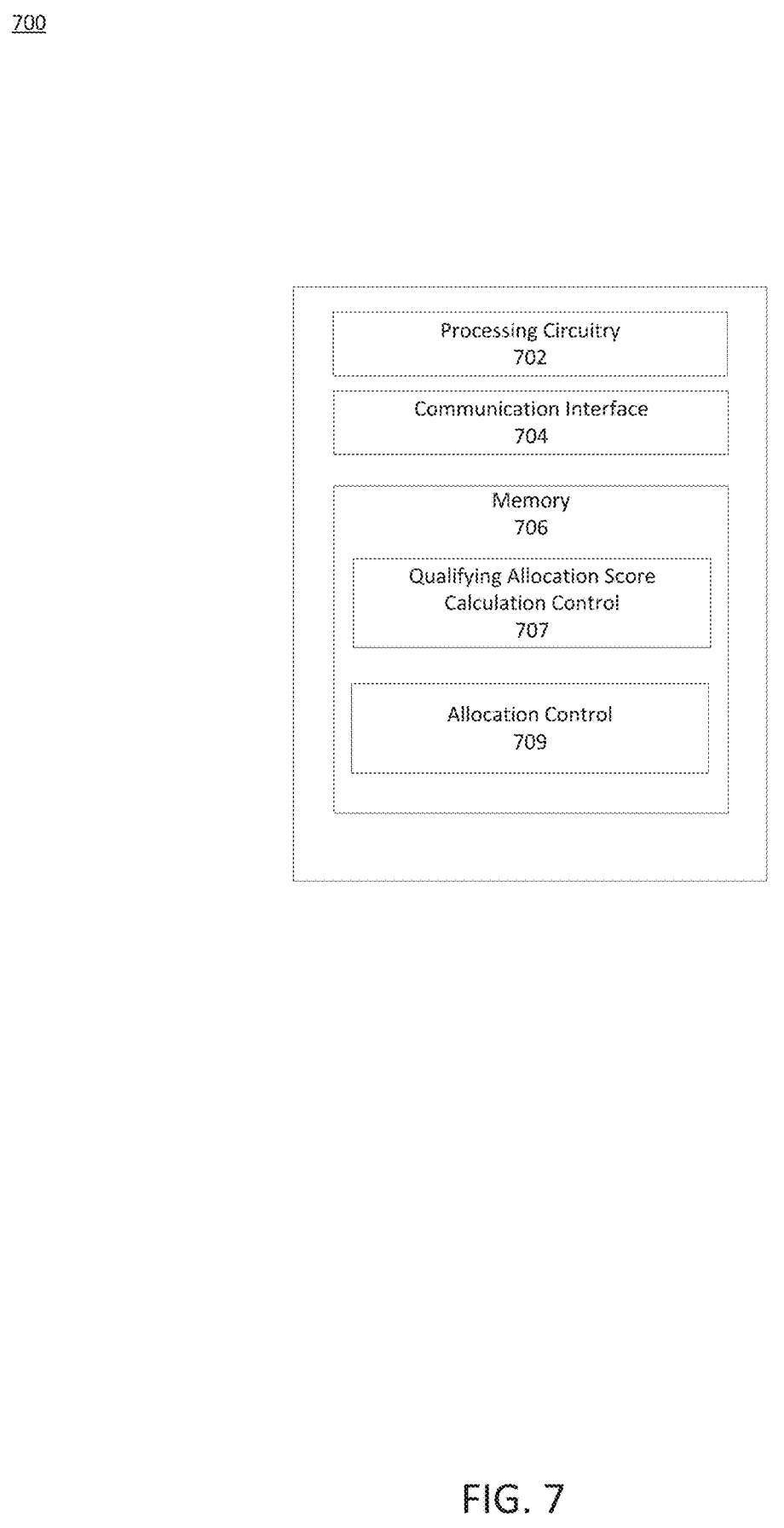

Processing Circuitry
702

Communication Interface
704

Memory
706

Qualifying Allocation Score
Calculation Control
707

Allocation Control
709

ENTITY ALLOCATION FOR NAVIGATED ROUTES

CROSS-REFERENCE TO RELATED APPLICATIONS

The Application claims the benefit of and priority to India provisional application no. 202241074589, filed on Dec. 22, 2022, the contents of which are incorporated herein by reference in their entirety.

TECHNICAL FIELD

The disclosure described herein generally relates to the computation of a complexity score (CS) and the use of the CS to optimally allocate entities to routes. More particularly, the disclosure relates to the computation of a CS using vehicle-based and/or other suitable alerts and collected data, which is then combined with a performance score to provide a context-sensitive view of the performance score to assist in assigning entities, such as drivers, vehicles, etc., to respective routes.

BACKGROUND

Software as a service (or SaaS) is a way of delivering applications over the Internet—as a service. Thus, instead of installing and maintaining software, users simply access it via the Internet, providing freedom from complex software and hardware management. SaaS applications are sometimes called Web-based software, on-demand software, or hosted software. In any event, SaaS applications run on a SaaS provider's servers. Typically, the SaaS provider manages access to the application, including security, availability, and performance.

One implementation of SaaS is with respect to online fleet management, which may be utilized for commercial vehicle fleets such those used by the transportation and shipping industry. In this context, SaaS applications leverage onboard devices installed in fleet vehicles to continuously scan the road and cabin environment, and then provide the driver with in-cabin audio and visual alerts in real time. The data collected via the onboard devices is then sent to the SaaS server(s). The fleet manager is able to receive insight via a user interface, which may be with respect to driver monitoring, road safety, driving habits, collision information, etc. In this way, the data obtained via a vehicle's onboard devices may assist a fleet operator in the allocation of a driver or vehicle to a particular route. Other management utilities may be configured to facilitate the allocation of entities other than vehicles or drivers to routes, which may include those implemented in the context of autonomous mobile robot (AMR) route and task allocation. However, in each of these cases, the manner in which such allocations are currently performed is inadequate.

BRIEF DESCRIPTION OF THE DRAWINGS/FIGURES

The accompanying drawings, which are incorporated herein and form a part of the specification, illustrate the present disclosure and, together with the description, further serve to explain the principles and to enable a person skilled in the pertinent art to make and use the implementations as discussed herein.

FIG. 5 illustrates a table summarizing the difference in various scores for drivers over segments that make up a route, in accordance with the disclosure;

FIG. 7 illustrates a computing device, in accordance with the disclosure; and

The present disclosure will be described with reference to the accompanying drawings. The drawing in which an element first appears is typically indicated by the leftmost digit(s) in the corresponding reference number.

DETAILED DESCRIPTION

Figure 1:
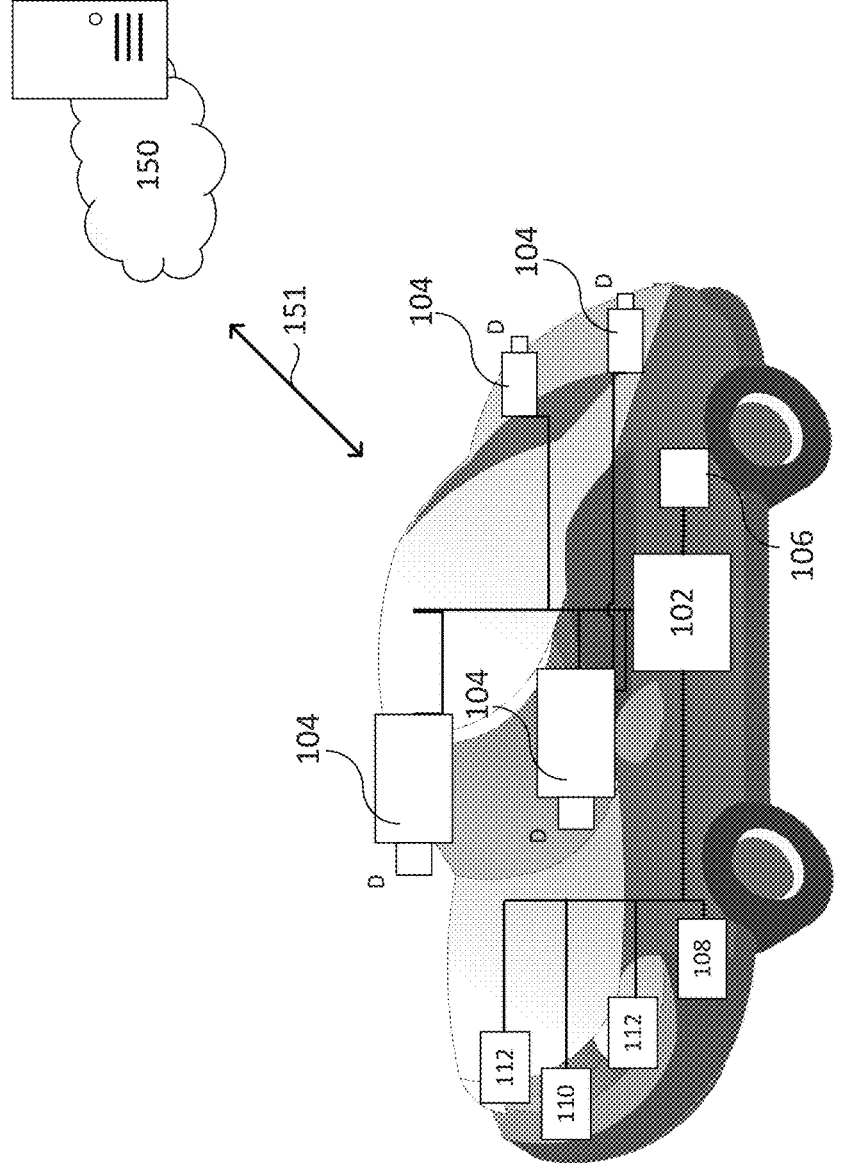
FIG. 1 illustrates a vehicle in accordance with the disclosure.

In the following description, numerous specific details are set forth in order to provide a thorough understanding of the present disclosure. However, it will be apparent to those skilled in the art that the implementations of the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring the disclosure.

I. Technology Overview

The disclosure as further described herein provides an entity allocation system that allows for entities to be allocated to specific navigated routes. As will be further discussed herein, the entity allocation system may be implemented in accordance with any suitable type of environment, and thus may be applicable to any suitable type of entities. In some scenarios, the entities may comprise drivers or vehicles, and thus the "complexity score" as discussed herein may comprise a "road complexity score" (RCS), and the "performance score" as discussed herein may comprise a "driver score" or a "vehicle score." However, in other scenarios the entities may comprise other types of agents, which may or may not operate in a road-based environment. In accordance with such scenarios, these agents may comprise any suitable type of agent, such as autonomous mobile robots (AMRs), which may operate in any suitable environment and/or may not utilize roads as a primary source of navigation. Thus, in accordance with these latter scenarios, the more generic terms of "complexity score" (CS) and "performance score" are used herein.

In any event, and as discussed in further detail below, the complexity score is used in conjunction with the performance score to optimize (or at least improve) the manner in which entities such as drivers, vehicles, AMRs, etc., may be allocated to specific routes. To do so, the combination of the complexity score and the performance score are used to compute a qualifying allocation score, which functions to "contextualize" the performance score. This qualifying allocation score indicates how specific entities (such as drivers, vehicles, AMRs, etc.) perform on specific routes, and may be computed taking into consideration both static and dynamic factors. This qualifying allocation score may comprise different types of scores based upon the particular entity that is to be allocated to a route. That is, when the entity to be allocated is a driver or a vehicle, then the qualifying allocation score may comprise a qualifying driver score and/or a qualifying vehicle score. In other scenarios in which a different entity (such as an AMR) is to be allocated to a route, then the more generic term "qualifying allocation score" may be used.

In any event, the qualifying allocation score may be leveraged as further discussed herein such that an identification may be made with respect to which entities perform best on certain routes, such that subsequent allocations of entities to routes may be made in a more intelligent and relevant manner than decisions based upon a performance score alone. That is, and with respect to driver allocation, it is noted that the conventional manner in which drivers are allocated to routes for fleets may rely upon a performance score (such as a driver score), but doing so misses the critical point of providing context to that driver score. That is, conventional solutions rank the driver score purely based on the performance of the driver, but without considering the route conditions under which the driver score was computed. Without that context, a driver with a driver score that is perfected, for instance, on urban driving roads under ideal conditions, can be allocated to a mountainous terrain route for which the driver is not well suited. In other words, ranking drivers purely based on a driver score fails to consider the route conditions upon which such scores are achieved. This can potentially pose safety-related concerns for that journey, as the allocation of the right driver for a given route is a significant safety consideration.

Moreover, "road experience" scores have been formulated in view of a passenger experience. However, this is different from road complexity, which is indicative of the skill required by a driver to drive on a particular road. Road experience scores are also not used to optimally map drivers to vehicles, given their lack of correlation with driver skill. Additionally, road experience scores are not intended to indicate the complexity of actually driving on a road.

The disclosure addresses these issues by providing context with respect to the driver score. In doing so, the disclosure aims to address the gap between pure performance score-based systems by introducing a new complexity score in the process. As further discussed below, the complexity score may be calculated in the context of driver and/or vehicle route allocation using vehicle-based alerts and environment-based data, which are collected for specific road segments. The complexity score is then combined with the performance score (such as the driver score in this scenario) to provide a context-sensitive view of the performance score. Again, this context-sensitive view may then be utilized for any suitable purpose, such as a determination regarding how to allocate the most well-suited entity to a given route. The determination and subsequent allocation of entities to routes as discussed herein may be advantageously performed as part of a fully automated process by establishing predetermined conditions upon which entities are allocated to subsequent routes based upon their qualifying allocation score for those same routes (or portions thereof). Such solutions may be particularly advantageous in the context of fleet management, but are not limited to these applications.

As further discussed below, the disclosure introduces a context qualifier by leveraging the complexity score, which is combined with the performance score to give an accurate view of the driver capability and skills or, alternatively, the capability of a vehicle or other entity. This information is then used to allocate the most suitable entity for a given route, which may include the allocation of best driver, vehicle, etc. To do so, a given route is analyzed for complexity (such as road complexity), and the entity (such as a driver) with the most competent score for that given complexity is assigned to the route. The complexity score may be used in a host of other use case settings in addition to or instead of fleet management, such as by providing supplemental map data to help qualify the road quality based on the complexity score. By tuning the road segment distance, the complexity score may also serve as a proxy for the road conditions.

II. Vehicle and Communication Architecture

FIG. 1 shows a vehicle 100 including a safety system 200 (see also FIG. 2) in accordance with the disclosure. The vehicle 100 and the safety system 200 are illustrative in nature, and may thus be simplified for explanatory purposes. Locations of elements and relational distances (the Figures are not to scale) are provided for illustrative purposes and not limitation. The safety system 200 may include various components depending on the requirements of a particular implementation. The safety system 200 may include various components depending on the requirements of a particular implementation and/or application, and may facilitate the navigation and/or control of the vehicle 100. The vehicle 100 may be an autonomous vehicle (AV), which may include any level of automation (e.g. levels 0-5), which includes no automation or full automation (level 5). The vehicle 100 may implement the safety system 200 as part of any suitable type of autonomous or driving assistance control system, including AV and/or an advanced driver-assistance system (ADAS), for instance. The safety system 200 may include one or more components that are integrated as part of the vehicle 100 during manufacture, part of an add-on or aftermarket device, or combinations of these. Thus, the various components of the safety system 200 as shown in FIG. 2 may be integrated as part of the vehicle 100's systems and/or part of an aftermarket system that is installed in the vehicle 100.

Figure 2:
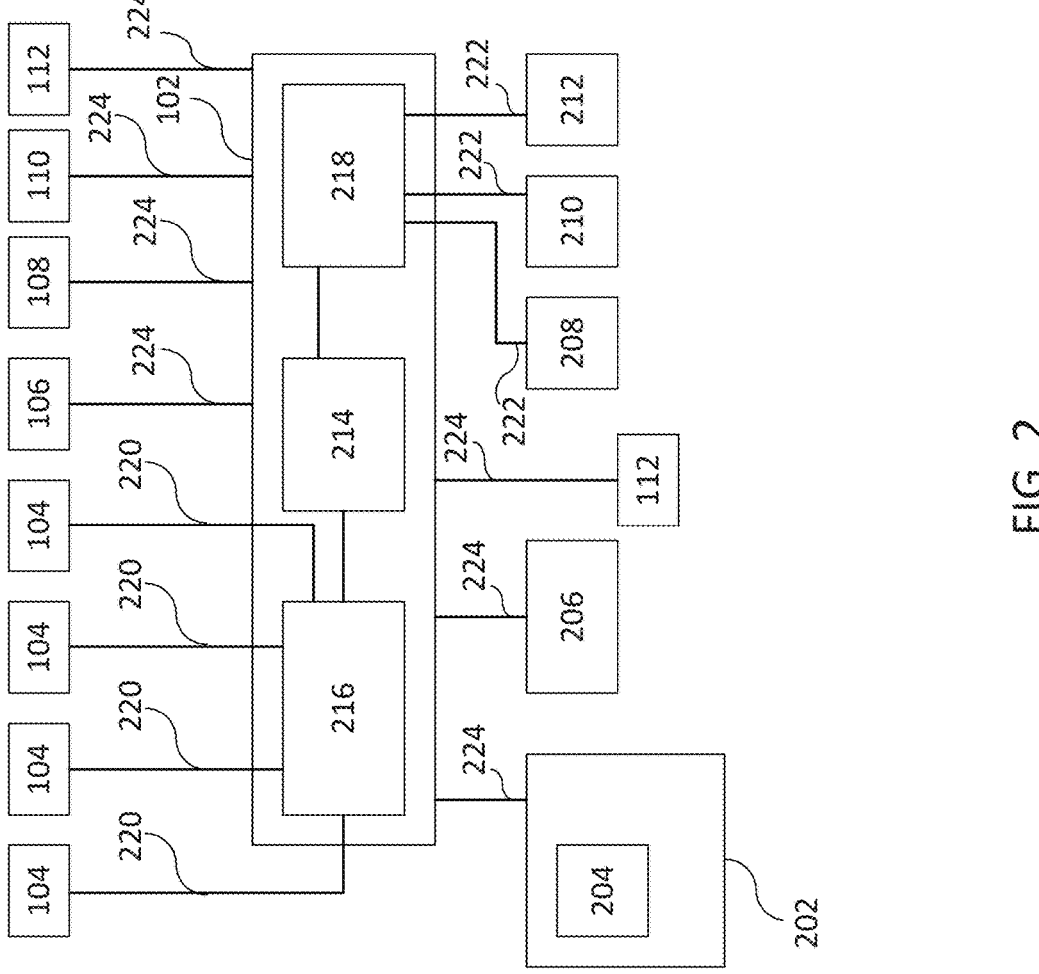
FIG. 2 illustrates components of a safety system of a vehicle in accordance with the present disclosure.

As shown in FIG. 1 and FIG. 2, the safety system 200 may include one or more processors 102, one or more image acquisition devices 104 such as, e.g., one or more cameras, one or more position sensors 106 such as a Global Navigation Satellite System (GNSS), e.g., a Global Positioning System (GPS), one or more memories 202, one or more map databases 204, one or more user interfaces 206 (such as, e.g., a display, a touch screen, a microphone, a loudspeaker, one or more buttons and/or switches, and the like), and one or more wireless transceivers 208, 210, 212. Additionally or alternatively, the one or more user interfaces 206 may be identified with other components in communication with the safety system 200, such as one or more components of an ADAS system, an AV system, etc., as further discussed herein.

The wireless transceivers 208, 210, 212 may be configured according to different desired radio communication protocols or standards. By way of example, a wireless transceiver (e.g., a first wireless transceiver 208) may be configured in accordance with a Short Range mobile radio communication standard such as e.g. Bluetooth, Zigbee, and the like. As another example, a wireless transceiver (e.g., a second wireless transceiver 210) may be configured in accordance with a Medium or Wide Range mobile radio communication standard such as e.g. a 3G (e.g. Universal Mobile Telecommunications System—UMTS), a 4G (e.g.

Long Term Evolution—LTE), or a 5G mobile radio communication standard in accordance with corresponding 3GPP (3rd Generation Partnership Project) standards. As a further example, a wireless transceiver (e.g., a third wireless transceiver 212) may be configured in accordance with a Wireless Local Area Network communication protocol or standard such as e.g. in accordance with IEEE 802.11 (e.g. 802.11, 802.11a, 802.11b, 802.11g. 802.11n, 802.11p, 802.11-12, 802.11ac, 802.11ad, 802.11ah, 802.11ax, 802.11ay, and the like). The one or more wireless transceivers 208, 210, 212 may be configured to transmit signals via an antenna system (not shown) via an air interface.

The one or more processors 102 may include any suitable type of processor or processor circuitry, such as an application processor 214, an image processor 216, a communication processor 218, or any other suitable processing device. For example, the one or more processors 102 may be configured to function as a controller for the vehicle 100 to analyze sensor data and received communications, to calculate specific actions for the vehicle 100 to execute for navigation and/or control of the vehicle 100, and to cause the corresponding action to be executed, which may be in accordance with an AV or ADAS system, for instance. The one or more processors 102 and/or the safety system 200 may form the entirety of or portion of an advanced driver-assistance system (ADAS) or an autonomous vehicle (AV) system.

Similarly, image acquisition devices 104 may include any suitable number of image acquisition devices and/or components depending on the requirements of a particular application. Image acquisition devices 104 may include one or more image capture devices (e.g., cameras, charge coupling devices (CCDs), or any other suitable type of image sensor). The safety system 200 may also include a data interface communicatively connecting the one or more processors 102 to the one or more image acquisition devices 104. As an illustrative and non-limiting scenario, a first data interface may include any wired and/or wireless first link 220, or first links 220 for transmitting image data acquired by the one or more image acquisition devices 104 to the one or more processors 102, e.g., to the image processor 216.

The wireless transceivers 208, 210, 212 may be coupled to the one or more processors 102, e.g., to the communication processor 218, e.g., via a second data interface. The second data interface may include any suitable wired and/or wireless second link 222 or second links 222 for transmitting radio transmitted data acquired by wireless transceivers 208, 210, 212 to the one or more processors 102, e.g., to the communication processor 218.

The memories 202, as well as the one or more user interfaces 206, may be coupled to each of the one or more processors 102, e.g., via a third data interface. The third data interface may include any wired and/or wireless third link 224 or third links 224. Furthermore, the position sensor 106 may be coupled to each of the one or more processors 102, e.g., via the third data interface.

Each processor 214, 216, 218 of the one or more processors 102 may include processing circuitry that implements any suitable type of hardware-based processing devices. To provide illustrative and non-limiting scenarios, each processor 214, 216, 218 may include a microprocessor, pre-processors (such as an image pre-processor), graphics processors, a central processing unit (CPU), support circuits, digital signal processors, integrated circuits, memory, or any other suitable types of devices suitable for running applications and for data processing (e.g. image processing, audio processing, etc.) and analysis. Each processor 214, 216, 218 may include any type of single or multi-core processor, mobile device microcontroller, central processing unit, etc. These processor types may each include multiple processing units with local memory and instruction sets. Such processors may include video inputs for receiving image data from multiple image sensors, and may also include video out capabilities.

Any of the processors 214, 216, 218 disclosed herein may be configured to perform certain functions in accordance with program instructions which may be stored in a memory of the one or more memories 202. In other words, a memory of the one or more memories 202 may store software that, when executed by a processor (e.g., by the one or more processors 102), controls the operation of the system, e.g., the safety system 200. A memory of the one or more memories 202 may store one or more databases and image processing software, as well as a trained system, such as a neural network, or a deep neural network, for example. The one or more memories 202 may include any number of random access memories, read only memories, flash memories, disk drives, optical storage, tape storage, removable storage, and other types of storage.

The wireless transceivers 208, 210, 212 may be configured to support any suitable type of communications (one-way or two-way) between the vehicle 100 and one or more other entities. Such entities may include (target) vehicles in an environment of the vehicle 100 (e.g., to facilitate coordination of navigation of the vehicle 100 in view of or together with other (target) vehicles in the environment of the vehicle 100), or even a broadcast transmission to unspecified recipients in a vicinity of the transmitting vehicle 100.

Such entities may additionally or alternatively include remote computing devices, such as the remote computing device 150 as shown in FIG. 1. Thus, the vehicle 100 may communicate with the remote computing device 150 via the link(s) 151, and may do so in accordance with any suitable number and/or type of communication protocols (such as using the wireless transceivers 208, 210, 212) to establish a connection and the exchange of data via the link(s) 151. In other words, the link(s) 151 may represent a wireless data connection between the one or more components of the vehicle 100 and a remote computing system in accordance with any suitable type and/or number of communication protocols.

The remote computing device 150 may implement connections to any suitable type of network and/or computing system, such as a cloud-computing system, and thus the remote computing device 150 may represent one or more wired and/or wireless networks, cloud-based storage systems, cloud-based processing systems, computing devices, etc. To provide an illustrative and non-limiting scenario, the remote computing system 150 may be implemented as an edge computing system and/or network. Such systems may enable the implementation of a SaaS model as discussed above, or any other suitable type of application (such as a web-based application), to facilitate the functionality of the entity allocation system as discussed herein, which again may be executed in a fully autonomous manner, or alternatively in a human-assisted semi-autonomous manner.

To perform such communications, the transceivers 208, 210, 212 may be configured to implement any suitable number and/or type of communication protocols. This may include, in a non-limiting and illustrative scenario, one or more vehicle to everything (V2X) communication protocols, which may include vehicle to vehicle (V2V), vehicle to infrastructure (V2I), vehicle to network (V2N), vehicle to pedestrian (V2P), vehicle to device (V2D), vehicle to grid (V2G), and any other suitable protocols. Other suitable protocols may include any suitable type of 3GPP and/or cellular-based protocols, Wi-Fi based protocols, etc.

The safety system 200 may further include components such as a sensor suite of any suitable number and/or type of sensors, each being configured to perform respective sensor measurements regarding its surrounding environment. For instance, such a sensor suite may comprise a speed sensor 108 (e.g., a speedometer) for measuring a speed of the vehicle 100. The safety system 200 may also include one or more accelerometers (either single axis or multiaxis, not shown) for measuring acceleration of the vehicle 100 along one or more axes. The safety system 200 may further include additional sensors or different sensor types such as an ultrasonic sensor, a thermal sensor, one or more radar sensors 110, one or more LIDAR sensors 112 (which may be integrated in the head lamps of the vehicle 100), digital compasses, and the like. The radar sensors 110 and/or the LIDAR sensors 112 may be configured to provide pre-processed sensor data, such as radar target lists or LIDAR target lists. The third data interface (e.g., one or more links 224) may couple the speed sensor 108, the one or more radar sensors 110, and/or the one or more LIDAR sensors 112 to at least one of the one or more processors 102.

The one or more memories 202 may store data, e.g., in a database or in any different format, that, e.g., indicate a location of known landmarks. The map database 204 may include any suitable type of database storing (digital) map data for the vehicle 100, e.g., for the safety system 200 and/or any other suitable data that may be used for mapping, routing, and/or navigational purposes. The map database 204 may include data relating to the position, in a reference coordinate system, of various items, including roads, water features, geographic features, businesses, points of interest, restaurants, gas stations, etc. A processor of the one or more processors 102 may update information from the map database 204 via communications over a wired or wireless data connection to a communication network (e.g., over a cellular network and/or the Internet, etc., which may include the link(s) 151). In some cases, the map database 204 may store a sparse data model including polynomial representations of certain road features (e.g., lane markings) or target trajectories for the vehicle 100. The map database 204 may also include stored representations of various recognized landmarks that may be provided to determine or update a known position of the vehicle 100 with respect to a target trajectory. The landmark representations may include data fields such as landmark type, landmark location, among other potential identifiers. The map database 204 can also include non-semantic features including point clouds of certain objects or features in the environment, and feature points and descriptors.

Furthermore, the safety system 200 may include a driving model (also referred to as a "driving policy model"), which may be utilized and/or executed as part of the ADAS system and/or AV system as discussed herein. By way of example, the safety system 200 may include (e.g., as part of the driving model) a computer implementation of a formal model such as a safety driving model. A safety driving model may be or include an implementation of a mathematical model formalizing an interpretation of applicable laws, standards, policies, etc. that are applicable to self-driving (e.g. ground) vehicles.

A safety driving model may be designed to achieve, e.g., three goals: first, the interpretation of the law should be sound in the sense that it complies with how humans interpret the law; second, the interpretation should lead to a useful driving policy, meaning it will lead to an agile driving policy rather than an overly-defensive driving which inevitably would confuse other human drivers and will block traffic, and in turn limit the scalability of system deployment; and third, the interpretation should be efficiently verifiable in the sense that it can be rigorously proven that the self-driving (autonomous) vehicle correctly implements the interpretation of the law. An implementation in a host vehicle of a safety driving model, illustratively, may be or include an implementation of a mathematical model for safety assurance that enables identification and performance of proper responses to dangerous situations such that self-perpetrated accidents can be avoided.

A safety driving model may implement logic to apply driving behavior rules such as the following five rules:

Do not hit someone from behind.

Do not cut-in recklessly.

Right-of-way is given, not taken.

Be careful of areas with limited visibility.

If you can avoid an accident without causing another one, you must do it.

It is to be noted that these rules are not limiting and not exclusive, and can be amended in various aspects as desired. The rules rather represent a "social driving contract" that might be different depending on the region, and may also develop over time. While these five rules are currently applicable in most countries, they might not be complete and may be amended.

As described above, the vehicle 100 may include the safety system 200 as also described with reference to FIG. 2. The vehicle 100 may include the one or more processors 102 e.g. integrated with or separate from an electronic control unit (ECU) of the vehicle 100. The safety system 200 may in general generate data to control or assist to control the ECU and/or other components of the vehicle 100 to directly or indirectly control the driving of the vehicle 100.

III. The Computation and Use of a Complexity Score

The vehicle 100 and safety system 200 as shown in FIGS. 1 and 2 are provided as non-limiting and illustrative implementations of an overall architecture that may be used to compute the complexity score (CS), as discussed in further detail below. To this end, the disclosure first describes the manner in which the CS may be computed using the various sensors and other components of a vehicle 100, which may be one of several vehicles that collects data in a similar or identical manner. The CS is then used, as noted above, to help provide context when combined with a performance score for the same drivers from which the CS was computed.

The CS may be computed as described herein locally on the vehicle 100, which may be implemented in one non-limiting and illustrative scenario via the one or more processors 102 executing instructions stored in a suitable memory (such as the memory 202), or as a hardware-based implementation. Alternatively, the CS may be computed by a remote computing device (such as the remote computing device 150) using the same information, or alternative or additional information (e.g. telemetry data from more than one vehicle) than that used by the vehicle 100 to do so. This may be achieved, for instance, via the remote computing device 150 receiving data from each vehicle for this purpose, which may be transmitted by the vehicle 100 via a respective link(s) 151. In such a scenario, the remote computing device 150 may likewise comprise a processor, processing circuitry, etc., and a memory (not shown) that stores instructions that, when executed by the processor, processing circuitry, etc., controls the operation of the remote computing device 150 to perform the various CS computations as well as the allocation (e.g. automatically) of entities to routes, as further discussed herein.

In any event, once the CS is computed in this manner for one or more drivers, the disclosure further provides a technique to utilize the CS to qualify the performance score, and to utilize the resulting qualifying allocation score to assign the most suited entity (such as a driver) for a given route that includes some or all of the same road segments from which the CS was computed. In other words, both the CS and the qualifying allocation score are calculated for a given route, which provides important context because a given route between points A and B is different than the route from B to A. That is, although the end points of a route may be the same, the direction is relevant in qualifying the scores for entity allocation.

IV. Calculating the Complexity Score (CS)

Figure 3:
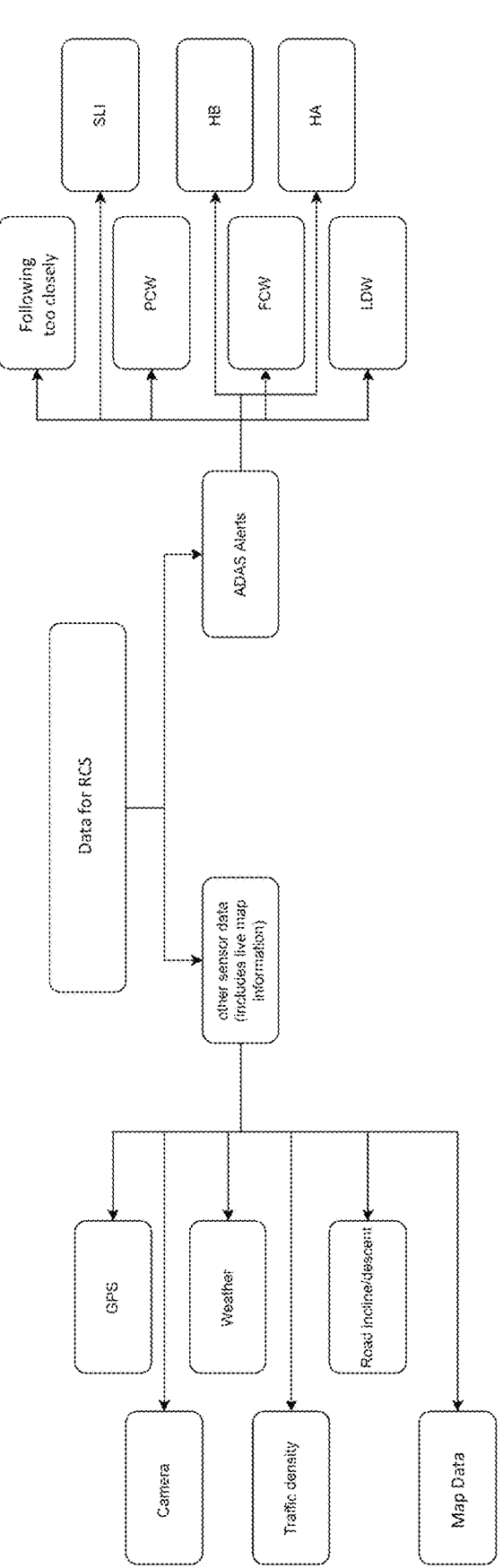
FIG. 3 illustrates a block diagram indicating data received from a host of sources used to compute the complexity score (CS), in accordance with the disclosure.

The complexity score (CS) may be calculated in different ways depending upon the particular type of entity that is to be allocated. That is, for entities such as drivers and vehicles (such as autonomous vehicles) that are driven on roads, the complexity score may comprise a road complexity score (RCS). The RCS may be based upon any suitable type of information that is relevant to the environment, driving habits, and/or driving conditions of the vehicle 100 while being driven along a route by a particular driver or, in other scenarios, autonomously navigating the route. FIG. 3 is provided with respect to scenarios that implement an allocation of entities that navigate via roads, such as drivers and vehicles. Thus, FIG. 3 illustrates a block diagram indicating data received from a host of sources used to compute the RCS, in accordance with the disclosure.

As shown in FIG. 3, the data used to compute the RCS is divided generally into two categories: environment-based data and ADAS-based alerts, which may be alternatively referred to herein as drive assist alerts. It is noted that the data used to compute the RCS as shown in FIG. 3 and further discussed herein is provided as illustrative scenarios and not by way of limitation, and the RCS may be computed in accordance with any suitable data type, which may be derived from any suitable data source(s). For instance, the data used to compute the RCS may additionally or alternatively encompass what is referred to as "telemetry data," which includes data that is collected from a vehicle and provides information on a host of vehicle parameters. Examples of such vehicle parameters may include the current status and/or condition of different parts of the vehicle (e.g. the engine, braking etc.), and additionally or alternatively may include data representative of a current driving "snapshot" (such as the current speed, braking information, the status of various vehicle electronic sub-systems, etc.). This telemetry data may be used to provide supplemental environment-based data or, in other scenarios, may function as an additional or alternative data source for the calculation of the RCS.

The sources identified with the environment-based data may comprise any suitable type of data source that may be received via communications from remote computing devices (such as the remote computing device 150), or generated, detected, computed, or otherwise identified locally via the onboard vehicle components, such as via the sensor suite as discussed above. Thus, the environment-based data may be received by one or more vehicles from the remote computing device 150, or vice-versa. The environment-based data may be alternatively referred to herein as sensor-based data. Generally speaking, the environment-based data comprises data representative and/or indicative of the conditions in which a vehicle is driven. The environment-based data may thus include data acquired via onboard cameras, location data identified with onboard GNSS systems, weather information, traffic density information, road information such as road shape, declines, inclines, etc., map data such as road types, vehicle pitch, yaw, and roll, etc. Additional or alternative environment-based data may be used for this purpose, to the extent that such data provides relevant information for differentiating routes among one another.

Moreover, the ADAS-based alerts may comprise any suitable drive assist alerts that may be generated locally (e.g. by the vehicle 100). The ADAS-based alerts may comprise any suitable number and/or type of warnings that may be issued via the vehicle's ADAS system (or other suitable systems) to mitigate collisions between the vehicle 100 and other vehicles or pedestrians, or to otherwise improve driving safety. Such ADAS-based alerts may be generated via the ADAS identified with the safety system 200 as shown and discussed above with respect to FIG. 2. Thus, and as shown in FIG. 3, such ADAS-based alerts may include alerts related to the occurrence of specific triggering events that are reported (which may be presented to the driver or collected without the driver's knowledge) by the ADAS system. Such ADAS-based alerts may represent, in a non-limiting and illustrative scenario, the vehicle 100 following too closely to another vehicle, the issuance of a Pedestrian Crossing Warning (PCW), a Forward Collision Warning (FCW), a Lane Departure Warning (LDW), Hard Breaking (HB), Harsh Acceleration (HA), a Speed Limit Indicator (SLI), etc. Additional or alternative ADAS-based data may be used for this purpose, to the extent that such data provides relevant information for differentiating routes among one another. Furthermore, although shown in FIG. 3 as ADAS alerts, these alerts are not limited to ADAS-based alerts, and may comprise any suitable type of alerts that provide contextual information regarding the computation of the RCS.

Thus, the RCS may be calculated in this way using any suitable combination of the environment-based data and the ADAS-based alerts. The environment-based data and the ADAS-based alerts data is then combined, and the RCS is calculated for a given stretch of road (i.e. calculated per road segment). The road segments may comprise any suitable type, length, and/or shape of a road that is derived from an overall route that is driven by a particular vehicle and, in some scenarios, a driver.

Figure 4:
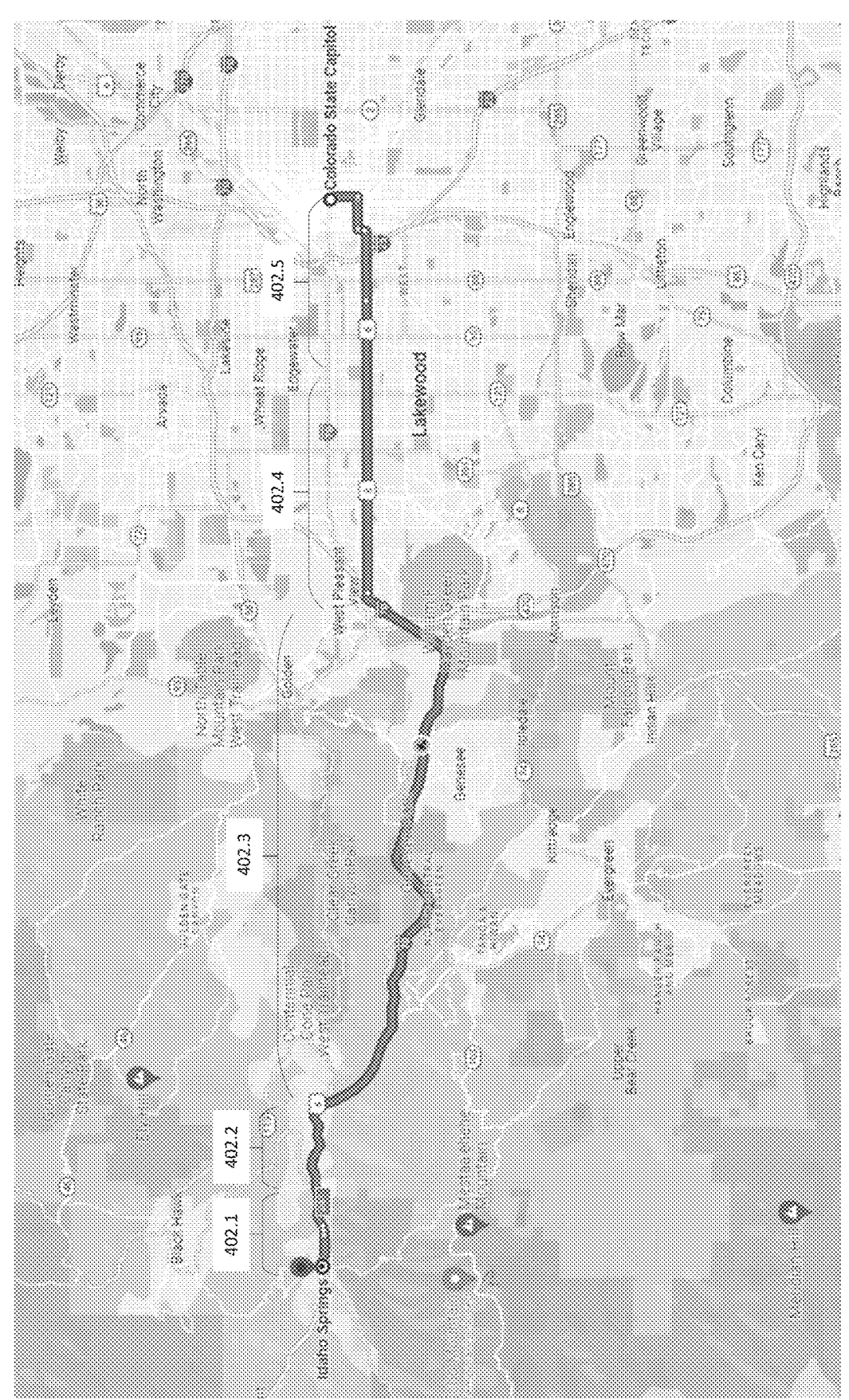
FIG. 4 illustrates a map showing road segments, in accordance with the disclosure.

To this end, FIG. 4 illustrates a map showing road segments, in accordance with the disclosure. FIG. 4 illustrates a sample route that is driven between the Colorado State Capitol building and the city of Idaho Springs. The route as shown in FIG. 4 includes five different road segments for brevity and case of explanation. The route may be divided into any suitable number and/or type of route segments based upon the particular region, the desired granularity of route segments, etc. Thus, the route as shown in FIG. 4 includes a route segment 402.1 identified with very mountainous terrain, a route segment 402.2 identified with slightly mountainous terrain, a road segment 402.3 that is identified with highway driving, a route segment 402.4 that is identified with a divided highway, and a road segment 402.5 that is identified with urban streets. Therefore, the route as shown in FIG. 4 illustrates five road segments 402.1-402.5, each being identified with a specific set of static features such as a road type, and which contribute to the computation of the RCS as further discussed below.

The alerts received via the vehicle while driving along a route are then grouped (e.g. via the computing device 150) along two key vectors to derive two key components of the RCS. The first of these components is a baseline score component, denoted herein as $RCS_{BS}$, whereas the second of these components is a dynamic score component, denoted herein as $RCS_{DS}$. The baseline score component $RCS_{BS}$ serves as the static component of the RCS, which may also be viewed as a base complexity of a given road segment, and is the same (for that particular road segment) under all driving conditions. The baseline score component $RCS_{BS}$ may thus be calculated per road segment using terrain data identified from vehicle camera-based systems, available road classification information from a map solution (such as Google Maps, Moovit, etc.), data stored in the map database 204, landmark information, historical alert data captured for the given road segment, etc. The baseline score $RCS_{BS}$ is therefore expected to be true irrespective of which driver and time of the day, as it is more indicative of the overall level of objective difficulty for navigating a given road segment.

To provide a non-limiting and illustrative scenario, a mountainous region (such as road segments 402.1, 402.2) or a forested region may have a higher baseline score $RCS_{BS}$ than a straight freeway road (such as the road segments 402.3, 402.4). As another non-limiting and illustrative scenario, a road configured as a single lane may have a higher baseline score $RCS_{BS}$ compared to a road configured for multi-lane traffic. In other words, any suitable combination of factors may be considered for a particular road segment for the computation of the baseline score component $RCS_{BS}$, such that the baseline score component $RCS_{BS}$ may be computed based upon a set of predefined parameters and not necessarily just a specific road type and/or location. Some of these parameters may include the condition of the road (e.g. a dirt road, a gravel road, a paved road, etc.), the road shape (straight versus twisting), elevation changes over the segment (e.g. a mountainous road and/or road segments with steep grades), the visibility along routes (e.g. forested or unlit road segments), whether the road segment is single or multilane, whether passing is allowed on the multilane segment, etc.

Thus, and referring back to FIG. 3, historical ADAS alerts, road incline/descent information, camera information, map data, accident counts, incident counts, etc., may all be used (or a subset thereof) to calculate the baseline score $RCS_{BS}$. A set of considerations that may be used for this computation are provided given below:

Historical alerts [such as a moving 1 year window] are plotted on a graph, and the area under the curve is taken as the corresponding score. Thus, the area under the curve 'A' may be dependent on the nature of the data. That is, if there is a function that may be defined, then a typical integration approach may be implemented to find the area under the curve between two points (such as different times, dates, etc.). otherwise, alternative computational techniques may be implemented such as the use of the trapezoidal rule.

The road incline/descent is mapped to a weighting value, which is then applied to the computed historical alerts score.

The camera based/map information is assumed to be available as a score, which is combined heuristically on the scores computed above.

A gray and black spot mapping information, which indicates the likelihood of accidents for the given stretch of road, is also mapped to a weighting value. This weighting value is then applied to the cumulative score computed from above.

In other words, the baseline score component $RCS_{BS}$ may be computed heuristically based on any suitable data that has been collected. As a non-limiting and illustrative scenario, the weight may be greater than a value of 1 if the data complexity is higher (uphill, descent with steep curves, a gray/black spot form the camera data, or from the map data, etc.). The weight may then be multiplied with a baseline score, which may be computed in accordance with any suitable techniques, such as known techniques, to provide the baseline score component $RCS_{BS}$ as discussed herein. In this case, less complex scores will be assigned weights <1.

A generic combination of all the above contributing factors (uphill, descent with steep curves, gray/black spot, map data, weather, etc.) may be added. As a non-limiting and illustrative scenario, the baseline score component $RCS_{BS}$ may be computed as $A*w_{road\_slope}* W_{accident\_profile}* w_{map\_data}+ \ldots$, where $w_{road\_slope}$, $W_{accident\_profile}$, $W_{map\_data}$ represent weights that are applied based on road slope, road segment accident profile (grey/black spots), and map data, respectively, to obtain the baseline score component $RCS_{BS}$.

It is noted that the manner in which the baseline score component $RCS_{BS}$ is computed, as well as the various parameters used for this computation, are described herein in a non-limiting and illustrative manner. The baseline score component $RCS_{BS}$ may thus be represented as any suitable range of values, such a numeric value having a range between 0 and 100, between 0 and 1, etc. Moreover, the weights may likewise comprise any suitable range of values, such as a numeric value between 0 and 100, between 0 and 1, etc. Thus, the numerical values of weights and scores may be mapped to any suitable range based upon a particular application.

Turning now to the dynamic score component $RCS_{DS}$, this component is used in combination with the baseline (i.e. static) score component $RCS_{BS}$ as discussed above based on the live (i.e. current when measured) road conditions. Thus, the dynamic score component $RCS_{DS}$ may function to qualify the baseline score component $RCS_{BS}$ based upon the current road conditions, and may include any suitable type of parameters that may change over time. For instance, dynamic conditions used to compute the dynamic score component $RCS_{DS}$ may include the traffic density, weather, driving patterns from other vehicles on the same road segment, etc. The dynamic score component $RCS_{DS}$ thus reflects the specific driving conditions for a given time of day, and hence indicates the "delta" challenges that exist "on top of" the baseline score of what a driver is required to deal with.

The ADAS alerts and environment-based data (as well as alternative or additional data such as e.g. telemetry data) of all the vehicles driving on the given road segment over a given time interval is thus collected and used for calculating the dynamic score component $RCS_{DS}$ for each road segment. The data in this context may comprise any suitable type of data that is collected and reported by other vehicles on the road in a similar or identical manner as discussed herein for the vehicle 100. Thus, and referring now back to FIG. 3, any suitable combination of the ADAS alerts of other vehicles during the same time interval, weather information, traffic density, etc., may be used to calculate the dynamic score component $RCS_{DS}$. A set of the factors influencing the computation are provided below:

Cumulative live alerts (e.g. corresponding to the time interval and from all vehicles on a road segment during that time interval) are plotted on a graph, and the area under the curve is taken as the corresponding score. Such a graph may comprise, for instance, a number of alerts versus the time of day. Thus, such an alert score may be based upon ADAS alerts or other alerts corresponding to a time period and road segment when the dynamic score is being computed.

Weather information may be mapped to a weighted value. As one illustrative scenario, ideal (or otherwise non-influential) driving weather may correspond to a weighting value of 1.0, whereas non-optimal weather may correspond to a higher weighting value (e.g. in a range between 1-5). This weighting value may then be multiplied by the alerts score, which may be computed as noted directly above. Continuing this illustrative scenario, the non-optimal weather condition may be directly mapped to the weather, as the condition exists for the specific road segment and over a given observation period. A moving window of historical data may be analyzed to assess any suitable type of metric, such as a weather-to-accident ratio, and a corresponding weighting value may then be assigned. For road segments missing such historical data, the weighting value may be the same weighting value used from other road segments with similar weather patterns for which historical data is available. The weighting value, therefore, may be normalized across road segments based on their shared experienced weather patterns.

Traffic density may be treated like the weather information with a weighting value attached. Such a traffic weighting value additionally qualifies the cumulative live alerts score.

As noted above for the baseline score component $RCS_{BS}$, the computation of the dynamic score component $RCS_{DS}$ may likewise be computed or otherwise learned heuristically based on any suitable data that has been collected. Thus, in a non-limiting and illustrative scenario, the dynamic score component $RCS_{DS}$ may be represented as a function f of any of the parameters described herein that may contribute to the dynamic score component $RCS_{DS}$. This may be represented as f(ADAS alerts and environment-based data, cumulative live alerts, weather information . . . ). As another non-limiting and illustrative scenario, the dynamic score component $RCS_{DS}$ may be represented as $A*w_1*w_2*w_3+\ldots$, where the area A may be computed as the area under the curve of any of the aforementioned parameters such as ADAS alerts and environment-based data, cumulative live alerts, weather information, etc., and the weights $w_1$, $w_2$, $w_3$ may represent weights that have been obtained from any of the aforementioned parameters as noted above.

As noted above for the baseline score component $RCS_{BS}$, the computation of the dynamic score component $RCS_{DS}$, as well as the various parameters used for this computation, are likewise described herein in a non-limiting and illustrative manner. The dynamic score component $RCS_{DS}$ may thus be represented as any suitable range of values, such a numeric value having a range between 0 and 100, between 0 and 1, etc. Also, the weights may likewise comprise any suitable range of values, such as a numeric value between 0 and 100, between 0 and 1, etc. Thus, the numeric values of weights and scores as discussed herein with respect to the baseline score component $RCS_B S$, the dynamic score component $RCS_{DS}$, and/or any other implementation of weights and scores may be mapped to any suitable range based upon a particular application.

In other words, the weighting values used for the computation of the dynamic score component $RCS_{DS}$ as noted above ensure that the dynamic score component adequately addresses the complexity identified with driving on a given road segment in accordance with the respective live conditions. As a non-limiting and illustrative scenario, a cumulative alerts score serves as a proxy for the driving complexity of a given live road segment, which is then appropriately qualified by the various weighting values. Thus, as the weighting value is normalized across similar conditions on other road segments, the dynamic score component $RCS_{DS}$ is a valid reference across varying road conditions.

An overall, per-segment RCS (otherwise referred to herein simply as the "RCS") is computed for each road segment (or a subset of such road segments) within a particular route as the ratio (for that road segment) of the dynamic score component $RCS_{DS}$ to the static or baseline score component $RCS_{BS}$, as shown in Equation 1 below:

$$RCS = \frac{RCS_{DS}}{RCS_{BS}} \qquad \text{Eqn. 1}$$

In other words, the overall RCS per each road segment indicates a factor of complexity introduced by the dynamic road conditions relative to the static road conditions. In this way, the changing road conditions, which have a significant bearing on driving (and hence driving performance), are incorporated into the overall RCS score per road segment. Thus, the complexity of driving on a given road segment is directly proportional to the RCS score for that particular road segment. As a result, the higher the RCS score, the higher the complexity identified with driving a particular road segment. To provide an illustrative scenario, a value greater than 1.0 may indicate baseline conditions that are further complicated by dynamic conditions. As another illustrative scenario, the dynamic conditions may case the ability to navigate the baseline challenges of a road segment, in which case the RCS will be a value less than 1.0.

The overall RCS score for the given road segment may then be stored as a metadata and used as map information. For instance, the overall RCS score for each road segment, once calculated, may be stored as part of the map data in the map database 204 and/or in (or accessible by) the remote computing device 150. This information may be used by the respective computing device (such as the remote computing device 150, the safety system 200, etc.) to make intelligent and informed decisions with respect to the selection of an entity (such as a driver) best suited for given road conditions, factoring in the static and dynamic challenges for the road segments comprising a particular route. The same RCS scores may then be used to qualify the driver score for all drivers plying for that road segment in the given time interval. Thus, a cumulative RCS for an entire route may be computed as the sum of each respective RCS score for each road segment within a particular route. Additional details are provided below with respect to the use of the RCS.

V. Using the RCS to Qualify the Performance Score and to Select an Optimal Entity In the present illustrative scenario, the entity that may be allocated to a route may comprise any suitable type of entity that navigates using road segments. Thus, an entity may comprise a driver or a vehicle. In either case, an assumed input used to compute a qualifying allocation score, denoted herein as $AS_q$, is the performance score (PS). When allocating drivers to routes, the qualifying allocation score comprises a qualified driver score, which is denoted as $DS_q$, and the performance score comprises a driver score (DS). When allocating vehicles to routes, the qualifying allocation score comprises a qualifying vehicle score, which is denoted as $VS_q$, and the performance score comprises a vehicle score (VS). The allocation of vehicles as entities may comprise autonomous vehicles, semi-autonomous vehicles, or any other suitable type of vehicle.

In either case, the performance score may be computed in any suitable manner, including known techniques to do so. Thus, for any given interval of time, both the complexity score and the performance score are calculated per road segment. The PS is calculated for every entity (such as every driver and/or vehicle) as the case may be, on that road segment, while the overall RCS per road segment again is a common value for all drivers and/or vehicles driving on a particular road segment during a time interval for which the RCS is computed. The overall RCS score per road segment is thus used to qualify the performance score. In a non-limiting and illustrative scenario, the qualifying allocation score $AS_q$ may be computed in accordance with Equation 2A below as follows:

$$AS_q = \frac{PS}{RCS} \qquad \text{Eqn. 2A}$$

In the above-referenced Eqn. 2A, it is assumed that the RCS indicates a road segment complexity in a directly proportional manner, i.e. an increasing RCS indicates an increasing road segment complexity. However, the RCS may alternatively be computed in a manner that is inversely proportional to the road segment complexity, and thus in such a case the qualifying allocation score AS, may be computed in accordance with Equation 2B below as follows:

$$AS_q = PS \cdot RCS \qquad \text{Eqn. 2B}$$

Regardless of the manner in which the RCS is computed, the resulting qualifying allocation score $AS_q$ computed using the RCS provides an inference that the higher the $AS_q$, the better the driver performance for the given road segment. Again, it is noted that $AS_q$ is calculated for a given stretch of road, i.e. for a given road segment. This means that the performance score for an entire journey (i.e. an overall route) will be the sum of performance scores for each of the road segments making up that route. For instance, a route between points A and B may be comprised of 5 road segments. As a result, there will be five values for $AS_q$, which are all summed together to calculate the final qualifying allocation score $AS_q$ for the entire route.

Turning now to FIG. 5, a table is shown as an illustrative scenario summarizing the difference in various scores for three drivers: X, Y, and Z, over five segments that make up a route between points A and B. With reference to FIG. 5, the RCSbs represents the RCS baseline score component, RCSds represents the RCS dynamic score component, DS represents the driver score, and DSq represents the qualifying driver score, as noted herein.

It is further noted that the scores do not necessarily originate from trips at the same time duration, but rather may be identified with trips at different time durations. Hence, the RCS dynamic score component $RCS_{DS}$ is different for the three drivers. The RCS dynamic score component $RCS_{DS}$ will be the same in a scenario in which it is derived from trips during the same time duration. However, as shown in the table in FIG. 5, the RCS baseline score component $RCS_{BS}$ is the same for every road segment, as this value is derived from trips in the same time window of calculation. Looking at the scores of $RCS_{BS}$ and $RCS_{DS}$ between the five road segments, it is clear that:

The road segment RS5 is the most difficult (i.e. complex) road segment when assessed from baseline conditions, as it has the highest value for $RCS_{BS}$. The contributing factors could be e.g. elevation, mountain, or forest regions, etc. Using this same criteria, it is also shown that the road segment RS1 is the easiest (i.e. least complex) road segment.

The road segment RS2, when Driver Y took the route, was the most complex from the perspective of dynamic conditions, as it has the highest value for $RCS_{DS}$. This could be e.g. due to factors such as weather conditions, traffic density, etc., during that particular time. Alternatively, it may be inferred that the dynamic conditions along the route between points A and B varies from a low of 96 (for RS1 during Driver Z's trip) to a high of 290 (for RS2 during Driver Y's trip).

With this in mind, if a decision with respect to the allocation of a qualified driver for a subsequent trip needs to be made among the three drivers, the metric $DS_q$ allows for a more nuanced decision process than would otherwise be possible. In other words, the qualifying driver score allows for a more accurate and reliable decision to be made with respect to the allocation of a driver based upon road segment complexity. For instance, if DS were the only criteria, Driver X (DS=1611) would be the best fit for the route between points A and B. But factoring in the varying dynamic conditions, it is evident that Driver Y (DSq=2464.8) is actually better suited for this route. Moreover, if there is an option to allocate any of these drivers based upon specific conditions, it is evident that Driver Y is better suited for RS2, where the dynamic conditions can be the toughest, while Driver X is better suited for RS5, which has the toughest baseline conditions. Thus, the optimal selection of the driver for a given route can be made based on different criteria, such as predetermined conditions being met, that best fit a predefined route requirement.

The above illustration includes a comparison of only three drivers for a specific route for ease of explanation. In a fleet management service offering, all this information may be continuously or periodically stored per driver and per road segment constituting all routes that are driven. This may be performed as part of any suitable application, such as a SaaS, which may advantageously offer such capability, and may include a large number or routes and drivers (e.g. several hundred, thousand, etc.). Thus, some fleet management servicers may have large databases (e.g. millions of kilometers of route data) collected across several hundred or more drivers. Given the amount of rich historical data available in such cases, this information may be leveraged to allow for predictive capabilities even for a new route that has not been driven.

Furthermore, in the illustrative scenario as shown in FIG. 5, the qualifying driver score $DS_q$ is used for allocating a driver to a specific route. Such an allocation may be performed via a suitable computing device (such as the computing device 150) based upon an analysis of the qualifying driver scores among a set of potential drivers plying for a specific route. This allocation may include identifying a driver from among the set of potential drivers (drivers X, Y, and Z in the present scenario) having the highest qualifying driver score, and allocating this driver to a subsequent route that comprises the route A-B.

The illustrative scenario of determining entity allocation as discussed with respect to FIG. 5 may be particularly useful when each driver is assigned to a predetermined vehicle in a fleet. In such a case, the qualifying driver score $DS_q$ may be considered as an exclusive metric to perform the entity allocation (drivers in this scenario) to a route. However, in other scenarios, drivers may not be assigned to specific vehicles, and thus a qualifying vehicle score $VS_q$ may be computed in addition to or instead of the qualifying driver score. In still other scenarios, the allocated entities may comprise fully autonomous vehicles that do not require a driver, and thus the qualifying vehicle score $VS_q$ may be considered as an exclusive metric to perform the entity allocation (vehicles in this scenario) to a route.

The qualifying vehicle score $VS_q$ may be computed in accordance with the same techniques discussed herein with respect to the qualifying driver score, and may use the same data to do so (such as ADAS-based alerts, environmental data, road incline/descent information, camera information, map data, and/or accident counts, etc.). However, additional or alternative data may also be used for computing the vehicle score, and the manner in which the overall RCS per road segment is computed may be adjusted to consider vehicle-specific features. For instance, the static or baseline score component $RCS_{BS}$ may weigh certain types of road metrics such as incline/descent information more heavily for larger or heavier vehicles, as this may represent a higher safety risk along routes for these vehicle types compared to smaller, lighter vehicles. Furthermore, road type information and/or weather data for specific road segments may be weighted to a lesser degree for vehicles having all-wheel drive capabilities, as slippery road conditions are expected to impact such vehicles to a lesser degree. As another illustrative scenario, additional or alternative metrics may be available with respect to fully autonomous vehicles versus driver-assisted vehicles. In a non-limiting and illustrative scenario, such metrics may include data with respect to classified objects, decisions made with respect to autonomous navigation functions, data indicating trajectories taken prior to and after the identification of specific types of classified objects, accident avoidance trajectories and/or maneuvers, data indicating the parameters of the vehicle's safety driving model (SDM), etc.

For entities that utilize roads for the navigation of routes, the allocation system as discussed herein may implement the qualifying driver score $DS_q$, the qualifying vehicle score $VS_q$, or a combination of both scores to determine the entity allocation to routes. Thus, as another illustrative scenario, an allocation of a driver and a vehicle to a route may be performed by selecting a driver with the highest qualifying driver score $DS_q$ from among a set of potential drivers, and also selecting the vehicle with the highest qualifying vehicle score $VS_q$ from among a set of available vehicles. The identified driver and vehicle may then be allocated to a specific route. Thus, and as noted above, the allocation of a driver and vehicle to a route may be performed by considering the qualifying driver score $DS_q$ and/or the qualifying vehicle score $VS_q$ independently of one another. As an illustrative scenario, a fleet manager may implement the entity allocation system as discussed herein via use of the computing device 150, which may execute or otherwise run the allocation system fully autonomously or semi-autonomously to determine and allocate each driver and/or vehicle to a route based upon the qualifying driver score $DS_q$ and/or the qualifying vehicle score $VS_q$.

However, in an alternative scenario, the determination of the allocation of entities may be based upon a qualifying allocation score $AS_q$, which is a function of the driver score DS and the vehicle score VS. As an illustrative scenario, Equations 3A-3B below show representations of how the qualifying allocation score $AS_q$ may be computed based upon a combination of the driver score DS and the vehicle score VS.

$$AS_q = f\left(\frac{(DS, VS)}{RCS}\right) \qquad \text{Eqn. 3A}$$

$$AS_q = f((DS, VS) \cdot RCS) \qquad \text{Eqn. 3B}$$

Thus, the qualifying allocation score $AS_q$ is computed as a function of both the driver score DS and the vehicle score VS, each being contextualized via the RCS as noted above for each score individually. The function as shown in Eqns. 3A and 3B may thus represent any suitable relationship between the qualifying allocation score $AS_q$, the qualifying driver score $DS_q$, and the qualifying vehicle score $VS_q$. In one illustrative scenario, the qualifying allocation score $AS_q$ may be represented as a linear weighted combination of the qualifying driver score DS, and the qualifying vehicle score $VS_q$ in accordance with Eqn. 4 below as follows:

$$AS_q = \alpha DS_q + \beta VS_q \qquad \text{Eqn. 4}$$

In accordance with this implementation, $\alpha$ and $\beta$ may represent respective weights that may be applied to the qualifying driver score $DS_q$ and the qualifying vehicle score $VS_q$. The weights may range between any suitable set of values (such as 0 and 1, 0 and 10, etc.), which may vary depending upon the particular application. As an illustrative scenario, the qualifying driver score $DS_q$ may be weighted more heavily (such as a value of 0.7, 0.8, 0.9, etc.) and the qualifying vehicle score $VS_q$ be weighted less heavily (such as a value of 0.1, 0.2, 0.3 etc.) to rely more on the performance of the driver instead of that of the vehicle. Such applications may be particularly useful when drivers are the more dynamically allocated entity within a fleet (such as when drivers are assigned to or rarely drive more than one vehicle). In this way, the qualifying allocation score $AS_q$ may enable an optimized mapping of drivers and vehicles to routes based upon a contribution of the qualifying driver score $DS_q$ and the qualifying vehicle score $VS_q$ by adjusting the weights as needed.

Figure 6:
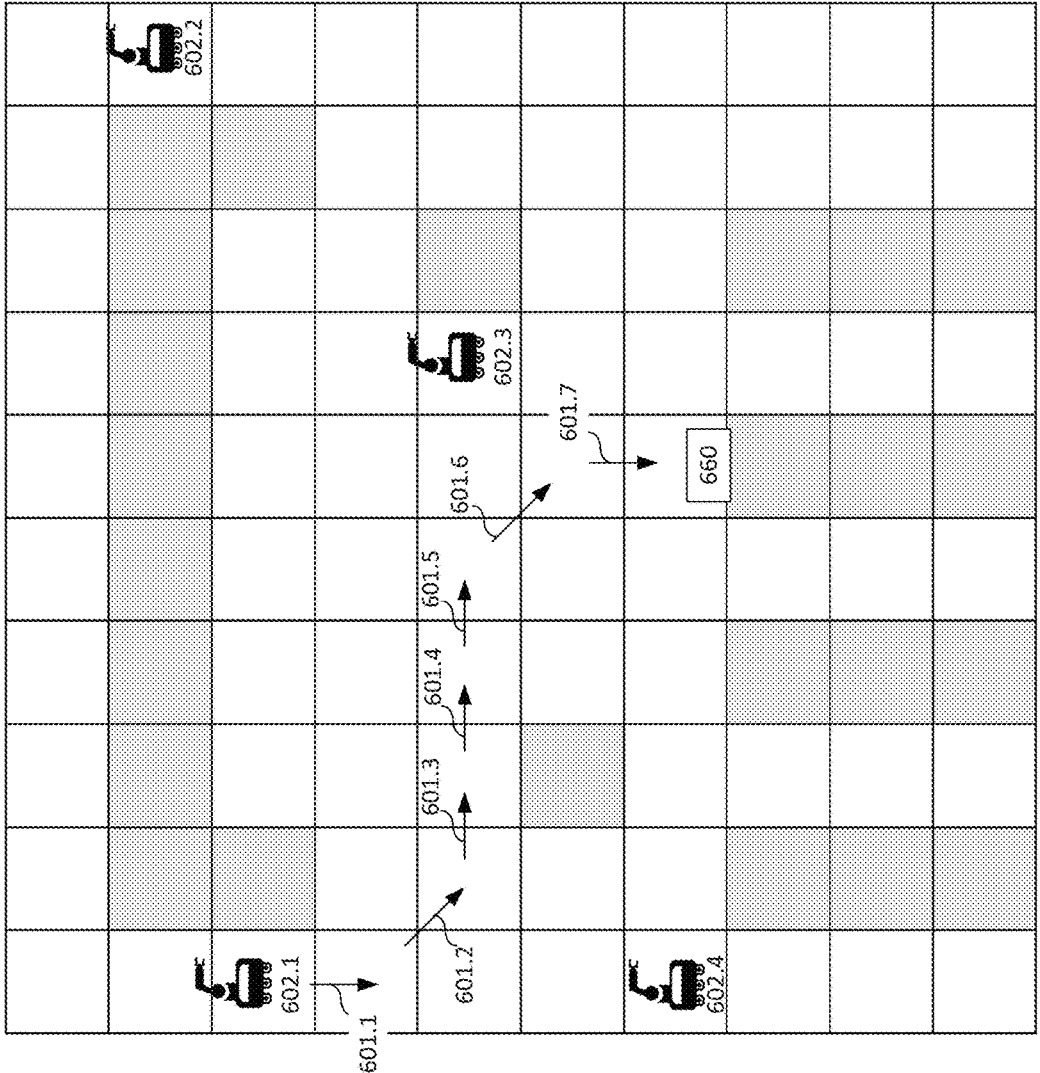
FIG. 6 illustrates a block diagram of an environment that includes autonomous mobile robots (AMRs), in accordance with the disclosure.
Figure 6:
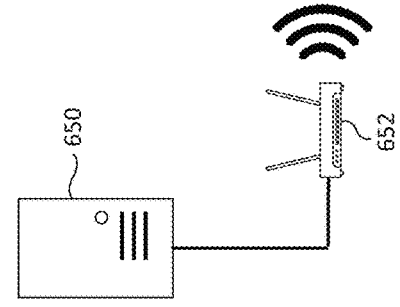

Thus, the qualifying allocation score $AS_q$ may be used to enable an allocation of entities such as road users, which may comprise drivers or vehicles, to particular routes. However, the allocation system as discussed herein may be implemented to allocate other types of entities, which may not necessarily comprise road users, i.e. may not utilize roads for the navigation of routes. As one illustrative scenario, the allocation system as discussed herein may be implemented to facilitate the allocation of autonomous mobile robots (AMRs) to routes within a suitable environment. To this end, FIG. 6 illustrates a block diagram of an environment that includes autonomous mobile robots (AMRs), in accordance with the disclosure. The environment 600 as shown in FIG. 6 comprises AMRs 602.1-602.4, which may be assigned to a respective tasks via computing device 650 via wireless communications, and which may be facilitated via the wireless transceiver 652. Thus, the environment 600 may be identified with a warehouse or other suitable environment in which the AMRs 602.1-602.4 operate.

As discussed above with respect to the remote computing device 150, the computing device 650 may implement connections to any suitable type of remote computing system, such as a cloud-computing system, and thus the computing device 650 may represent one or more wired and/or wireless networks, cloud-based storage systems, cloud-based processing systems, computing devices, etc. As another illustrative scenario, the computing system 650 may be implemented as an edge computing system and/or network. Such systems may enable the implementation of a SaaS model as discussed above, or any other suitable type of application (such as a web-based application), to facilitate the functionality of the entity allocation system as discussed herein.

In any event, the tasks assigned to the AMRs 602 via the computing device 650 may comprise any suitable number and/or type of tasks, such as placing a number of objects from a conveyor belt onto a pallet 660, picking up and moving objects, performing maintenance on other AMRs, etc. Furthermore, each of the AMRs 602 may be assigned a task related to placing the objects onto a pallet from the conveyor belt, and then moving the objects, once placed onto the pallets, to a designated target area within the environment 600. That is, the AMRs 602.1-602.4 as shown in FIG. 6 may perform tasks related to moving objects onto a pallet, navigating to a new area of the environment 600 to move the pallet to that location, and then unloading the objects on the pallet at a predefined location.

As part of these tasks, each of the AMRs 602 is instructed (via information received via wireless communications by the computing device 650) to follow a specific path, or route, within the environment 600. To do so, the computing device 650 may access information with respect to the mapped environment 600, which may be divided into a grid pattern in accordance with known techniques. As part of the path or route planning process, each AMR 602 is instructed to follow a specific sequence and pattern of blocks within the mapped grid of the environment 600. These paths may be repeated for different tasks based upon the location of the AMRs 602 and the target objectives as each task is assigned. To provide an illustrative scenario, the AMR 602.1 may follow the path formed by the navigation segments 601.1-601.7, which may also be followed by other AMRs 602.1-602.4 to complete similar tasks at different times. Thus, the entity allocation system as discussed herein may be implemented via the computing device 650, and may analyze the navigation segments 601.1-601.7 in the same manner as the route segments discussed herein to assign a particular AMR 602 to a particular route (i.e. path) as part of the task assignment. That is, if multiple AMRs 602.1-602.4 are available to perform the same task that requires traversal of the navigation segments 601.1-601.7, an available AMR may be allocated to take this task and path in a similar manner as the vehicles and drivers are allocated to a specific route as discussed above.

To do so, the computing device 650 may implement the techniques as discussed herein to compute, for each of the AMRs 602, a corresponding qualifying allocation score, and then select the AMR having the highest qualifying allocation score (or apply other predetermined criteria) to allocate an AMR to that particular path. To do so, for other types of (non-vehicle or driver) entities, which may operate in other environments that do not include roads, the complexity score as discussed herein may be computed based upon any suitable type of information that is relevant to the specific environment in which the entity operates. That is, the CS may still be computed using static and dynamic information, although the types of data used for these computations may differ when road segments are generalized to navigation segments.

That is, an AMR 602 may not generate ADAS-based alerts, but may generate other types of data using its onboard sensors, which may be implemented to compute the static and dynamic components of the complexity score CS in the same manner as discussed above with respect to the RCS. In an illustrative scenario, the static CS component per each navigation segment traversed by the AMRs 602 may be computed based upon data that is received from the AMRs during their operation, such as historical alerts, collisions or near collisions, camera information, map data, etc. The dynamic CS component per each navigation segment traversed by the AMRs 602 may also be computed based upon data that is received from the AMRs during their operation, but may additionally or alternatively include other types of information that indicate more dynamically changing conditions. Such data may include alerts of other AMRs 602 at a time interval that matches that of an AMR 602 on the same respective navigation segment, changes to the mapped environment, new obstacles within routes, sensed conditions that have changed (such as detected obstacles, spilled fluids), etc.

Thus, and as noted above for the use of the RCS, the CS for each of the navigation segments 607 may likewise comprise a static CS component based upon a type of each respective navigation segment, and a dynamic CS component that is based upon conditions associated with each respective navigation segment when driven by the agent (an AMR in this scenario). The computation of the CS may thus generally mirror that as discussed above for the RCS, such as the computation of the CS for each of a plurality of navigation segments (such as 607.1-607.8) being computed as a ratio of the dynamic CS component to the static CS component for each respective one of the plurality of navigation segments. In this way, the CS may be implemented for the allocation of any suitable type of entity based upon the particular application. The CS may thus be computed in any case using data that is relevant to the performance of entities along routes in that environment such that subsequent allocations of entities to routes may be accurately made.

VI. A Computing Device

FIG. 7 illustrates a block diagram of a computing device, in accordance with aspects of the disclosure. The computing device 700 may be identified with the computing device 150, as discussed herein with reference to FIG. 1 or the computing device 650 as shown and described with respect to FIG. 6. Additionally or alternatively, the computing device 700 may be identified with a component of the safety system 200 as discussed herein, or a separate computing device that may be implemented within the vehicle 100 or in any separate suitable environment. The computing device 700 may be identified with any suitable type of computing device, such as those described herein with respect to the computing devices 150, 650. Additionally or alternatively, the computing device 700 may be identified with a desktop computer, a laptop, a server computer, a tablet computer, a mobile device, a cloud computing device, or one or more components thereof such as a GPU, a CPU, etc. The computing device 700 may include processing circuitry 702, a communication interface 704, and a memory 706. The components shown in FIG. 7 are provided for ease of explanation, and the computing device 700 may implement additional, less, or alternative components as those shown in FIG. 7.

The processing circuitry 702 may be configured as any suitable number and/or type of computer processors, which may function to control the computing device 700 and/or other components of the computing device 700. The processing circuitry 702 may be identified with one or more processors (or suitable portions thereof) implemented by the computing device 700, and may include processors identified with the safety system 200 as discussed herein (e.g. the one or more processors 102, one or more of the processors 214A, 214B, 216, 218, etc.) The processing circuitry 700 may be identified with one or more processors such as a host processor, a CPU, a digital signal processor, one or more microprocessors, graphics processors, a graphics processing unit (GPU), baseband processors, microcontrollers, an application-specific integrated circuit (ASIC), part (or the entirety of) a field-programmable gate array (FPGA), etc.

The processing circuitry 702 may be identified with any suitable type of architecture, and may be configured as any suitable number and/or type of components configured to facilitate the computing device 700 performing any of the various functions as discussed herein with respect to the computation of performance scores, complexity scores, and/or the allocation of entities to routes, as well as any intermediate computations and/or steps that may be implemented to do so. The processing circuitry 702 may be configured to carry out instructions to perform arithmetical, logical, and/or input/output (I/O) operations, and/or to control the operation of one or more components of computing device 700 to perform various functions as described herein. The processing circuitry 702 may include one or more microprocessor cores, memory registers, buffers, clocks, etc., and may generate electronic control signals associated with the components of the computing device 700 to control and/or modify the operation of these components. The processing circuitry 702 may communicate with and/or control functions associated with the communication interface 704 and/or the memory 706.

The communication interface 704 may be implemented as any suitable number and/or type of components that function to interface with additional devices, and may implement buses, ports, data interfaces, memory controllers, drivers, buffers, front-ends, antennas, etc. The communication interface 704 may form part of an overall communication circuitry implemented by the computing device 700, which may communicate with other computing devices to receive and/or transmit data. The communication interface 704 may facilitate the computing device 700 receiving and/or transmitting data to implement any of the various functions as discussed herein with respect to the computation of performance scores, complexity scores, and/or the allocation of entities to routes, as well as any intermediate computations and/or steps that may be implemented to do so. For instance, the communication interface 704 may facilitate the computing device 700 receiving data from entities such as vehicles, AMRs, etc., as discussed herein, which may comprise ADAS-based alerts, AMR data, road data such as road incline/descent information, camera information, map data, accident counts, etc.

The memory 706 is configured to store data and/or instructions such that, when the instructions are executed by the processing circuitry 702, cause the computing device 700 (or the vehicle 100 and/or safety system 200 of which the computing device 400 may form a part) to perform various functions as described herein. The memory 706 may be implemented as any suitable volatile and/or non-volatile memory, including read-only memory (ROM), random access memory (RAM), flash memory, a magnetic storage media, an optical disc, erasable programmable read only memory (EPROM), programmable read only memory (PROM), etc. The memory 706 may be non-removable, removable, or a combination of both. The memory 706 may be implemented as a non-transitory computer readable medium storing one or more executable instructions such as logic, algorithms, code, etc.

As further discussed below, the instructions, logic, code, etc., stored in the memory 706 are represented by the various modules as shown in FIG. 7, which may enable the various functions of the aspects as described herein to be functionally realized. Alternatively, if implemented via hardware, the modules shown in FIG. 7 associated with the memory 706 may include instructions and/or code to facilitate control and/or monitor the operation of such hardware components. In other words, the modules as shown in FIG. 7 are provided for ease of explanation regarding the functional association between hardware and software components. Thus, the processing circuitry 702 may execute the instructions stored in these respective modules in conjunction with one or more hardware components to perform the various functions as discussed herein.

The qualifying allocation score calculation control module 707 may facilitate the execution of the functionality as discussed herein with reference to the computation of the performance score and complexity scores, as well as the computation of the qualifying allocation scores from these scores, etc. The executable instructions stored in the qualifying allocation score calculation control module 707 may facilitate, in conjunction with execution via the processing circuitry 702, the computing device 700 receiving any suitable type of data to compute the qualifying allocation scores for one or more entities from per-segment (such as road segments, navigation segments, etc.) data computations. As one illustrative scenario, the qualifying allocation scores may represent a qualifying driver score, a qualifying vehicle score, or a combination of both scores, as discussed herein. As another illustrative scenario, the qualifying allocation scores may be identified with entities that do not utilize roads but navigate along routes, such as AMRs.

The allocation control module 709 may facilitate the execution of the functionality as discussed herein with reference to the determination of an allocation of entity to a specific route based upon the qualifying allocation score that is computed for each one of a set of entities (such as drivers, vehicles, AMRs, etc.). The executable instructions stored in the allocation control module 709 may facilitate, in conjunction with execution via the processing circuitry 702, the computing device 700 determining an allocation of entities based upon one or more conditions being met. This may include, in one illustrative scenario, the computing device 700 identifying a subsequent route that includes all or a portion of segments from which the complexity scores were computed as discussed herein. The computing device 700 may then determine a ranking of entities in accordance with their respective qualifying allocation scores and/or identify the entity with the highest qualifying allocation score as the entity to be allocated to the route. The determination of how to allocate an entity to a route may consider any other suitable conditions (which may be weighted or otherwise computed) in addition to the qualifying allocation score, such as the driver experience, etc.

VII. A Process Flow

Figure 8:
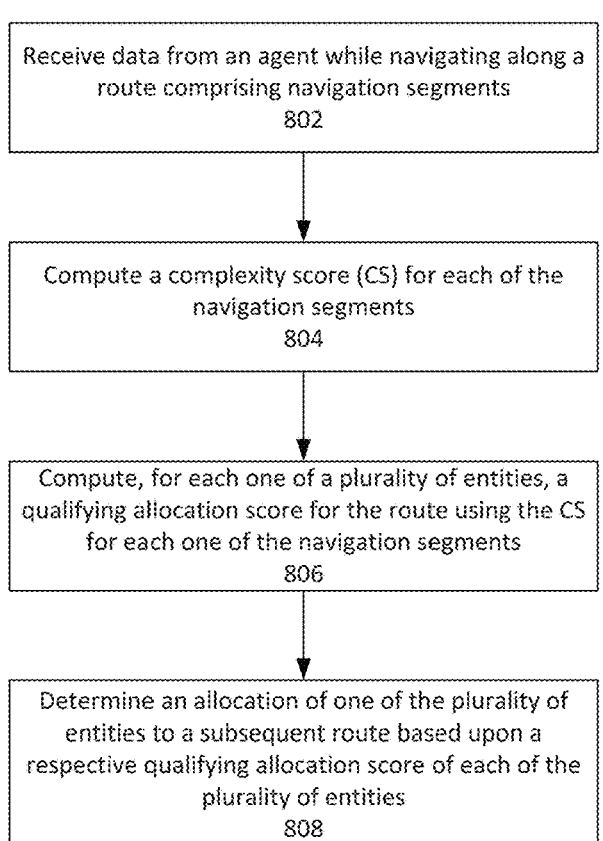
FIG. 8 illustrates a process flow, in accordance with the disclosure.

FIG. 8 illustrates a process flow, in accordance with one or more aspects of the disclosure. The process flow 800 may include alternate or additional steps that are not shown in FIG. 8 for purposes of brevity, and may be performed in a different order than the steps shown in FIG. 8. With reference to FIG. 8, the process flow 800 may be a computer-implemented method executed by and/or otherwise associated with one or more processors (processing circuitry) in conjunction with computer-readable (e.g. executable) instructions that may be stored on any suitable number and/or type of storage devices.

The various functions associated with the process flow 800 as discussed herein may be executed, for instance, via any suitable computing device and/or processing circuitry identified with the vehicle 100 and/or the safety system 200, as discussed herein. This may include, for instance, the one or more processors 102, one or more of the processors 214A, 214B, 216, 218, etc., executing instructions stored in a suitable memory (e.g. the one or more memories 202). Additionally or alternatively (or in combination), the various functions associated with the process flow 800 as discussed herein may be executed, for instance, via processing circuitry identified with any suitable type of computing device that may be identified with the vehicle 100 (e.g. a chip, an aftermarket product, etc.) or otherwise communicates with one or more components of the vehicle 100. Additionally or alternatively (or in combination), the various functions associated with the process flow 800 as discussed herein may be executed, for instance, via one or more suitable computing devices, such as the remote computing device 150, the computing device 650, the computing device 700, etc., as discussed herein.

The process flow 800 may begin with receiving (block 802) data from an agent while navigating along a route comprising navigation segments. Such navigation segments may be identified with road segments or other suitable types of segments as discussed herein. The received data may comprise any suitable type of data that is received form any suitable number and/or type of entities or other sources, from which the qualifying allocation scores as discussed herein may be computed and used for entity allocation to subsequent routes. Again, such received data may comprise ADAS-based alerts, AMR data, road data such as road incline/descent information, camera information, map data, accident counts, etc.

The process flow 800 may include computing (block 804) a complexity score (CS) for each of the navigation segments. The complexity score may represent a road complexity score or other type of segment-based score that is computed using the per-segment data as discussed herein. The CS may be computed with a static and dynamic score component from the different types of data, as noted above.

The process flow 800 may include computing (block 806) a qualifying allocation score for the route for each one of a plurality of entities. This may include the computation of a qualifying allocation score that represents a qualifying vehicle score, a qualifying driver score, a combination of these scores, or a qualifying allocation score for another entity that does not use road segments for navigation (such as AMRs). The qualifying allocation score may thus be computed in accordance with any suitable techniques that contextualize a corresponding performance score, as discussed herein.

The process flow 800 may include determining (block 808) an allocation of one of the plurality of entities to a subsequent route based upon a respective qualifying alloca-tion score of each of the plurality of entities. Again, this may include the identification of a subsequent route that includes all or a portion of segments from which the complexity scores were computed as discussed herein. Once the route is identified, the process flow 800 may include the determination of an allocation of an entity to the route based upon which of the entities meet one or more predetermined conditions, as noted above. Such conditions may comprise the highest qualifying allocation score such that the entity with the highest qualifying allocation score is allocated to the subsequent route. Again, these predetermined conditions may include other suitable factors in addition to the qualifying allocation score, as noted above.

VIII. General Operation of a First Computing Device

A computing device is provided. The computing device comprises a memory configured to store computer-readable instructions, and a processor configured to execute the computer-readable instructions stored in the memory to cause the computing device to: receive data from a vehicle of a route comprising a plurality of road segments, the data comprising (i) environment-based data, and (ii) drive assist alerts; compute, from the data, a road complexity score (RCS) for one or more of the plurality of road segments; compute, for one or more of a plurality of entities, a qualifying allocation score for the route based upon the RCS computed for the respective one or more of the plurality of road segments; and determine an allocation of an entity from the plurality of entities to a subsequent route based upon the respective qualifying allocation score of each of the plurality of entities. The plurality of entities comprise a plurality of road users, and the plurality of road users comprise a plurality of vehicles or a plurality of drivers. In addition or in alternative to and in any combination with the optional features previously explained in this paragraph, the RCS for the one or more of the plurality of road segments comprises (i) a static RCS component based upon a road type of the respective one or more road segments, and (ii) a dynamic RCS component that is based upon driving conditions associated with the respective one or more road segments when driven by the vehicle. In addition or in alternative to and in any combination with the optional features previously explained in this paragraph, the RCS for the one or more of the plurality of road segments is computed as a ratio of the dynamic RCS component to the static RCS component for the respective one or more of the plurality of road segments. In addition or in alternative to and in any combination with the optional features previously explained in this paragraph, the static RCS component for the one or more of the plurality of road segments is computed based upon historical drive assist alerts, road incline/descent information, camera information, map data, or accident counts. In addition or in alternative to and in any combination with the optional features previously explained in this paragraph, the dynamic RCS component for each respective one of the plurality of road segments is computed based upon (i) drive assist alerts of other vehicles at a time interval that matches that driven by the vehicle on the respective road segment, (ii) weather information, or (iii) traffic density.

IX. General Operation of a First Non-Transitory Computer-Readable Medium

A non-transitory computer-readable medium is provided, having instructions stored thereon that, when executed by processing circuitry of a computing device, cause the computing device to: receive data from a vehicle of a route comprising a plurality of road segments, the data comprising (i) environment-based data, and (ii) drive assist alerts; compute, from the data, a road complexity score (RCS) for one or more of the plurality of road segments; compute, for one or more of a plurality of entities, a qualifying allocation score for the route based upon the RCS computed for the respective one or more of the plurality of road segments; and determine an allocation of an entity from the plurality of entities to a subsequent route based upon the respective qualifying allocation score of the one or more of the plurality of entities. The plurality of entities further comprise a plurality of road users, wherein the plurality of road users comprise a plurality of vehicles or a plurality of drivers. In addition or in alternative to and in any combination with the optional features previously explained in this paragraph, the RCS for the one or more of the plurality of road segments comprises (i) a static RCS component based upon a road type of the respective one or more road segments, and (ii) a dynamic RCS component that is based upon driving conditions associated with the respective one or more road segments when driven by the vehicle. In addition or in alternative to and in any combination with the optional features previously explained in this paragraph, the RCS for the one or more of the plurality of road segments is computed as a ratio of the dynamic RCS component to the static RCS component for the respective one or more of the plurality of road segments. In addition or in alternative to and in any combination with the optional features previously explained in this paragraph, the static RCS component for the one or more of the plurality of road segments is computed based upon historical ADAS alerts, road incline/descent information, camera information, map data, or accident counts. In addition or in alternative to and in any combination with the optional features previously explained in this paragraph, the dynamic RCS component for the respective one or more of the plurality of road segments is computed based upon (i) drive assist alerts of other vehicles at a time interval that matches that driven by the vehicle on the respective road segment, (ii) weather information, or (iii) traffic density.

X. General Operation of a Second Computing Device

Another computing device is provided, comprising: a memory configured to store computer-readable instructions; and a processor configured to execute the computer-readable instructions stored in the memory to cause the computing device to: receive data from an agent of a route comprising a plurality of navigation segments; compute, from the data, a complexity score (CS) for one or more of the plurality of segments; compute, for one or more of a plurality of entities, a qualifying allocation score for the route based upon the CS computed for the respective one or more of the plurality of navigation segments; and determine an allocation of an entity from the plurality of entities to a subsequent route based upon the respective qualifying allocation score of the one or more of the plurality of entities. The plurality of entities comprise a plurality of autonomous mobile robots (AMRs). In addition or in alternative to and in any combination with the optional features previously explained in this paragraph, CS for the one or more of the plurality of navigation segments comprises (i) a static CS component based upon a type of the respective one or more navigation segments, and (ii) a dynamic CS component that is based upon conditions associated with the respective one or more navigation segments when driven by the agent. In addition or in alternative to and in any combination with the optional features previously explained in this paragraph, the CS for one or more of the plurality of navigation segments is computed as a ratio of the dynamic CS component to the static CS component for the respective one or more of the plurality of navigation segments. In addition or in alternative to and in any combination with the optional features previously explained in this paragraph, the static CS component for the respective one or more of the plurality of navigation segments is computed based upon historical alerts, camera information, or map data. In addition or in alternative to and in any combination with the optional features previously explained in this paragraph, the dynamic CS component for the respective one or more of the plurality of navigation segments is computed based upon alerts of other agents at a time interval that matches that of the agent on the respective navigation segment.

XI. General Operation of a Second Non-Transitory Computer-Readable Medium

Another non-transitory computer-readable medium is provided having instructions stored thereon that, when executed by processing circuitry of a computing device, cause the computing device to: receive data from an agent of a route comprising a plurality of navigation segments; compute, from the data, a complexity score (CS) for one or more of the plurality of navigation segments; compute, for one or more of a plurality of entities, a qualifying allocation score for the route based upon the CS computed for the respective one or more of the plurality of navigation segments; and determine an allocation of an entity from the plurality of entities to a subsequent route based upon the respective qualifying allocation score of the one or more of the plurality of entities. The plurality of entities comprise a plurality of autonomous mobile robots (AMRs). In addition or in alternative to and in any combination with the optional features previously explained in this paragraph, the CS for one or more of the plurality of navigation segments comprises (i) a static CS component based upon a type of the respective one or more navigation segments, and (ii) a dynamic CS component that is based upon conditions associated with the respective one or more navigation segments when driven by the agent. In addition or in alternative to and in any combination with the optional features previously explained in this paragraph, the CS for one or more of the plurality of navigation segments is computed as a ratio of the dynamic CS component to the static CS component for the respective one or more of the plurality of navigation segments. In addition or in alternative to and in any combination with the optional features previously explained in this paragraph, the static CS component for the respective one or more of the plurality of navigation segments is computed based upon historical alerts, camera information, or map data. In addition or in alternative to and in any combination with the optional features previously explained in this paragraph, the dynamic CS component for the respective one or more of the plurality of navigation segments is computed based upon alerts of other agents at a time interval that matches that of the agent on the respective navigation segment.

EXAMPLES

The following examples pertain to further aspects.

An example (e.g. example 1) is directed to a computing device, comprising: a memory configured to store computer-readable instructions; and a processor configured to execute the computer-readable instructions stored in the memory to cause the computing device to: receive data from a vehicle of a route comprising a plurality of road segments, the data comprising (i) environment-based data, and (ii) drive assist alerts; compute, from the data, a road complexity score (RCS) for one or more of the plurality of road segments; compute, for one or more of a plurality of entities, a qualifying allocation score for the route based upon the RCS computed for the respective one or more of the plurality of road segments; and determine an allocation of an entity from the plurality of entities to a subsequent route based upon the respective qualifying allocation score of each of the plurality of entities.

Another example (e.g. example 2) relates to a previously-described example (e.g. example 1), wherein the plurality of entities comprises a plurality of road users and wherein the plurality of road users comprises a plurality of vehicles or a plurality of drivers.

Another example (e.g. example 3) relates to a previously-described example (e.g. one or more of examples 1-2), wherein the RCS for the one or more of the plurality of road segments comprises (i) a static RCS component based upon a road type of the respective one or more road segments, and (ii) a dynamic RCS component that is based upon driving conditions associated with the respective one or more road segments when driven by the vehicle.

Another example (e.g. example 4) relates to a previously-described example (e.g. one or more of examples 1-3), wherein the RCS for the one or more of the plurality of road segments is computed as a ratio of the dynamic RCS component to the static RCS component for the respective one or more of the plurality of road segments.

Another example (e.g. example 5) relates to a previously-described example (e.g. one or more of examples 1-4), wherein the static RCS component for the one or more of the plurality of road segments is computed based upon historical drive assist alerts, road incline/descent information, camera information, map data, or accident counts.

Another example (e.g. example 6) relates to a previously-described example (e.g. one or more of examples 1-5), wherein the dynamic RCS component for each respective one of the plurality of road segments is computed based upon (i) drive assist alerts of other vehicles at a time interval that matches that driven by the vehicle on the respective road segment, (ii) weather information, or (iii) traffic density.

An example (e.g. example 7) is directed to a non-transitory computer-readable medium having instructions stored thereon that, when executed by processing circuitry of a computing device, cause the computing device to: receive data from a vehicle of a route comprising a plurality of road segments, the data comprising (i) environment-based data, and (ii) drive assist alerts; compute, from the data, a road complexity score (RCS) for one or more of the plurality of road segments; compute, for one or more of a plurality of entities, a qualifying allocation score for the route based upon the RCS computed for the respective one or more of the plurality of road segments; and determine an allocation of an entity from the plurality of entities to a subsequent route based upon the respective qualifying allocation score of the one or more of the plurality of entities.

Another example (e.g. example 8) relates to a previously-described example (e.g. example 7), wherein the plurality of entities comprises a plurality of road users and wherein the plurality of road users comprises a plurality of vehicles or a plurality of drivers.

Another example (e.g. example 9) relates to a previously-described example (e.g. one or more of examples 7-8), wherein the RCS for the one or more of the plurality of road segments comprises (i) a static RCS component based upon a road type of the respective one or more road segments, and (ii) a dynamic RCS component that is based upon driving conditions associated with the respective one or more road segments when driven by the vehicle.

Another example (e.g. example 10) relates to a previously-described example (e.g. one or more of examples 7-9), wherein the RCS for the one or more of the plurality of road segments is computed as a ratio of the dynamic RCS component to the static RCS component for the respective one or more of the plurality of road segments.

Another example (e.g. example 11) relates to a previously-described example (e.g. one or more of examples 7-10), wherein the static RCS component for the one or more of the plurality of road segments is computed based upon historical ADAS alerts, road incline/descent information, camera information, map data, or accident counts.

Another example (e.g. example 12) relates to a previously-described example (e.g. one or more of examples 7-11), wherein the dynamic RCS component for the respective one or more of the plurality of road segments is computed based upon (i) drive assist alerts of other vehicles at a time interval that matches that driven by the vehicle on the respective road segment, (ii) weather information, or (iii) traffic density.

An example (e.g. example 13) is directed to a computing device, comprising: a memory configured to store computer-readable instructions; and a processor configured to execute the computer-readable instructions stored in the memory to cause the computing device to: receive data from an agent of a route comprising a plurality of navigation segments; compute, from the data, a complexity score (CS) for one or more of the plurality of segments; compute, for one or more of a plurality of entities, a qualifying allocation score for the route based upon the CS computed for the respective one or more of the plurality of navigation segments; and determine an allocation of an entity from the plurality of entities to a subsequent route based upon the respective qualifying allocation score of the one or more of the plurality of entities.

Another example (e.g. example 14) relates to a previously-described example (e.g. example 13), wherein the plurality of entities comprises a plurality of autonomous mobile robots (AMRs).

Another example (e.g. example 15) relates to a previously-described example (e.g. one or more of examples 13-14), wherein the CS for the one or more of the plurality of navigation segments comprises (i) a static CS component based upon a type of the respective one or more navigation segments, and (ii) a dynamic CS component that is based upon conditions associated with the respective one or more navigation segments when driven by the agent.

Another example (e.g. example 16) relates to a previously-described example (e.g. one or more of examples 13-15), wherein the CS for one or more of the plurality of navigation segments is computed as a ratio of the dynamic CS component to the static CS component for the respective one or more of the plurality of navigation segments.

Another example (e.g. example 17) relates to a previously-described example (e.g. one or more of examples 13-16), wherein the static CS component for the respective one or more of the plurality of navigation segments is computed based upon historical alerts, camera information, or map data.

Another example (e.g. example 18) relates to a previously-described example (e.g. one or more of examples 13-17), wherein the dynamic CS component for the respective one or more of the plurality of navigation segments is computed based upon alerts of other agents at a time interval that matches that of the agent on the respective navigation segment.

An example (e.g. example 19) relates to a non-transitory computer-readable medium having instructions stored thereon that, when executed by processing circuitry of a computing device, cause the computing device to: receive data from an agent of a route comprising a plurality of navigation segments; compute, from the data, a complexity score (CS) for one or more of the plurality of navigation segments; compute, for one or more of a plurality of entities, a qualifying allocation score for the route based upon the CS computed for the respective one or more of the plurality of navigation segments; and determine an allocation of an entity from the plurality of entities to a subsequent route based upon the respective qualifying allocation score of the one or more of the plurality of entities.

Another example (e.g. example 20) relates to a previously-described example (e.g. example 19), wherein the plurality of entities comprises a plurality of autonomous mobile robots (AMRs).

Another example (e.g. example 21) relates to a previously-described example (e.g. one or more of examples 19-20), wherein the CS for one or more of the plurality of navigation segments comprises (i) a static CS component based upon a type of the respective one or more navigation segments, and (ii) a dynamic CS component that is based upon conditions associated with the respective one or more navigation segments when driven by the agent.

Another example (e.g. example 22) relates to a previously-described example (e.g. one or more of examples 19-21), wherein the CS for one or more of the plurality of navigation segments is computed as a ratio of the dynamic CS component to the static CS component for the respective one or more of the plurality of navigation segments.

Another example (e.g. example 23) relates to a previously-described example (e.g. one or more of examples 19-22), wherein the static CS component for the respective one or more of the plurality of navigation segments is computed based upon historical alerts, camera information, or map data.

Another example (e.g. example 24) relates to a previously-described example (e.g. one or more of examples 19-23), wherein the dynamic CS component for the respective one or more of the plurality of navigation segments is computed based upon alerts of other agents at a time interval that matches that of the agent on the respective navigation segment.

An example (e.g. example 25) is directed to a computing device, comprising: a memory configured to store computer-readable instructions; and a processing means for executing the computer-readable instructions stored in the memory to cause the computing device to: receive data from a vehicle of a route comprising a plurality of road segments, the data comprising (i) environment-based data, and (ii) drive assist alerts; compute, from the data, a road complexity score (RCS) for one or more of the plurality of road segments; compute, for one or more of a plurality of entities, a qualifying allocation score for the route based upon the RCS computed for the respective one or more of the plurality of road segments; and determine an allocation of an entity from the plurality of entities to a subsequent route based upon the respective qualifying allocation score of each of the plurality of entities.

Another example (e.g. example 26) relates to a previously-described example (e.g. example 25), wherein the plurality of entities comprises a plurality of road users and wherein the plurality of road users comprises a plurality of vehicles or a plurality of drivers.

Another example (e.g. example 27) relates to a previously-described example (e.g. one or more of examples 25-26), wherein the RCS for the one or more of the plurality of road segments comprises (i) a static RCS component based upon a road type of the respective one or more road segments, and (ii) a dynamic RCS component that is based upon driving conditions associated with the respective one or more road segments when driven by the vehicle.

Another example (e.g. example 28) relates to a previously-described example (e.g. one or more of examples 25-27), wherein the RCS for the one or more of the plurality of road segments is computed as a ratio of the dynamic RCS component to the static RCS component for the respective one or more of the plurality of road segments.

Another example (e.g. example 29) relates to a previously-described example (e.g. one or more of examples 25-28), wherein the static RCS component for the one or more of the plurality of road segments is computed based upon historical drive assist alerts, road incline/descent information, camera information, map data, or accident counts.

Another example (e.g. example 30) relates to a previously-described example (e.g. one or more of examples 25-29), wherein the dynamic RCS component for each respective one of the plurality of road segments is computed based upon (i) drive assist alerts of other vehicles at a time interval that matches that driven by the vehicle on the respective road segment, (ii) weather information, or (iii) traffic density.

An example (e.g. example 31) is directed to a non-transitory computer-readable medium having instructions stored thereon that, when executed by processing means of a computing device, cause the computing device to: receive data from a vehicle of a route comprising a plurality of road segments, the data comprising (i) environment-based data, and (ii) drive assist alerts; compute, from the data, a road complexity score (RCS) for one or more of the plurality of road segments; compute, for one or more of a plurality of entities, a qualifying allocation score for the route based upon the RCS computed for the respective one or more of the plurality of road segments; and determine an allocation of an entity from the plurality of entities to a subsequent route based upon the respective qualifying allocation score of the one or more of the plurality of entities.

Another example (e.g. example 32) relates to a previously-described example (e.g. example 31), wherein the plurality of entities comprises a plurality of road users and wherein the plurality of road users comprises a plurality of vehicles or a plurality of drivers.

Another example (e.g. example 33) relates to a previously-described example (e.g. one or more of examples 31-32), wherein the RCS for the one or more of the plurality of road segments comprises (i) a static RCS component based upon a road type of the respective one or more road segments, and (ii) a dynamic RCS component that is based upon driving conditions associated with the respective one or more road segments when driven by the vehicle.

Another example (e.g. example 34) relates to a previously-described example (e.g. one or more of examples 31-33), wherein the RCS for the one or more of the plurality of road segments is computed as a ratio of the dynamic RCS component to the static RCS component for the respective one or more of the plurality of road segments.

Another example (e.g. example 35) relates to a previously-described example (e.g. one or more of examples 31-34), wherein the static RCS component for the one or more of the plurality of road segments is computed based upon historical drive assist alerts, road incline/descent information, camera information, map data, or accident counts.

Another example (e.g. example 36) relates to a previously-described example (e.g. one or more of examples 31-35), wherein the dynamic RCS component for the respective one or more of the plurality of road segments is computed based upon (i) drive assist alerts of other vehicles at a time interval that matches that driven by the vehicle on the respective road segment, (ii) weather information, or (iii) traffic density.

An example (e.g. example 37) is directed to a computing device, comprising: a memory configured to store computer-readable instructions; and a processing means for executing the computer-readable instructions stored in the memory to cause the computing device to: receive data from an agent of a route comprising a plurality of navigation segments; compute, from the data, a complexity score (CS) for one or more of the plurality of segments; compute, for one or more of a plurality of entities, a qualifying allocation score for the route based upon the CS computed for the respective one or more of the plurality of navigation segments; and determine an allocation of an entity from the plurality of entities to a subsequent route based upon the respective qualifying allocation score of the one or more of the plurality of entities.

Another example (e.g. example 38) relates to a previously-described example (e.g. example 37), wherein the plurality of entities comprises a plurality of autonomous mobile robots (AMRs).

Another example (e.g. example 39) relates to a previously-described example (e.g. one or more of examples 37-38), wherein the CS for the one or more of the plurality of navigation segments comprises (i) a static CS component based upon a type of the respective one or more navigation segments, and (ii) a dynamic CS component that is based upon conditions associated with the respective one or more navigation segments when driven by the agent.

Another example (e.g. example 40) relates to a previously-described example (e.g. one or more of examples 37-39), wherein the CS for one or more of the plurality of navigation segments is computed as a ratio of the dynamic CS component to the static CS component for the respective one or more of the plurality of navigation segments.

Another example (e.g. example 41) relates to a previously-described example (e.g. one or more of examples 37-40), wherein the static CS component for the respective one or more of the plurality of navigation segments is computed based upon historical alerts, camera information, or map data.

Another example (e.g. example 42) relates to a previously-described example (e.g. one or more of examples 37-41), wherein the dynamic CS component for the respective one or more of the plurality of navigation segments is computed based upon alerts of other agents at a time interval that matches that of the agent on the respective navigation segment.

An example (e.g. example 43) relates to a non-transitory computer-readable medium having instructions stored thereon that, when executed by processing means of a computing device, cause the computing device to: receive data from an agent of a route comprising a plurality of navigation segments; compute, from the data, a complexity score (CS) for one or more of the plurality of navigation segments; compute, for one or more of a plurality of entities, a qualifying allocation score for the route based upon the CS computed for the respective one or more of the plurality of navigation segments; and determine an allocation of an entity from the plurality of entities to a subsequent route based upon the respective qualifying allocation score of the one or more of the plurality of entities.

Another example (e.g. example 44) relates to a previously-described example (e.g. example 43), wherein the plurality of entities comprises a plurality of autonomous mobile robots (AMRs).

Another example (e.g. example 45) relates to a previously-described example (e.g. one or more of examples 43-44), wherein the CS for one or more of the plurality of navigation segments comprises (i) a static CS component based upon a type of the respective one or more navigation segments, and (ii) a dynamic CS component that is based upon conditions associated with the respective one or more navigation segments when driven by the agent.

Another example (e.g. example 46) relates to a previously-described example (e.g. one or more of examples 43-45), wherein the CS for one or more of the plurality of navigation segments is computed as a ratio of the dynamic CS component to the static CS component for the respective one or more of the plurality of navigation segments.

Another example (e.g. example 47) relates to a previously-described example (e.g. one or more of examples 43-46), wherein the static CS component for the respective one or more of the plurality of navigation segments is computed based upon historical alerts, camera information, or map data.

Another example (e.g. example 48) relates to a previously-described example (e.g. one or more of examples 43-47), wherein the dynamic CS component for the respective one or more of the plurality of navigation segments is computed based upon alerts of other agents at a time interval that matches that of the agent on the respective navigation segment.

A method as shown and described.

An apparatus as shown and described.

CONCLUSION

The aforementioned description will so fully reveal the general nature of the disclosure that others can, by applying knowledge within the skill of the art, readily modify and/or adapt for various applications without undue experimentation, and without departing from the general concept of the present disclosure. Therefore, such adaptations and modifications are intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It is noted that the aforementioned implementations are provided as non-limiting and illustrative scenarios, which may encompass various specific use cases. The implementations as discussed herein may deviate from those discussed herein, with some functions and/or implementations being optional in some scenarios. For instance, a "lighter" version of the interface as discussed herein may be utilized, which is more cost effective.

References in the specification to "one implementation." "an implementation," "an exemplary implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

The implementations described herein are provided for illustrative purposes, and are not limiting. Other implementations are possible, and modifications may be made to the described implementations. Therefore, the specification is not meant to limit the disclosure. Rather, the scope of the disclosure is defined only in accordance with the following claims and their equivalents.

The implementations described herein may be facilitated in hardware (e.g., circuits), firmware, software, or any combination thereof. Implementations may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processing circuitry" or "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to implementations described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the implementations described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. A computing device, comprising:
   a memory configured to store computer-readable instructions; and
   a processor configured to execute the computer-readable instructions stored in the memory to cause the computing device to:
      while navigating a driving environment, receive, via one or more wireless links in accordance with a communication protocol, data from a vehicle of a route comprising a plurality of road segments, the data comprising (i) environment-based data, and (ii) drive assist alerts,
   wherein the environment-based data is acquired from onboard vehicle sensors of the vehicle, and the drive assist alerts are generated by an Advanced Driver Assistance System (ADAS) of the vehicle,
   wherein the data is stored in a database and collected over time from a plurality of vehicles while navigating a region including the route;
      compute, from the data, a road complexity score (RCS) for respective road segments of the plurality of road segments;
      periodically compute, for one or more of a plurality of entities based on aggregated data received from the plurality of vehicles over time, a qualifying allocation score for the route as new data is received from the plurality of vehicles and stored in the database, the qualifying allocation score for the route being based upon a summation of per road segment qualifying allocation scores computed for the respective road segments,
   wherein the per road segment qualifying allocation scores are computed based upon the RCS computed for the respective road segments,
   wherein the plurality of entities comprise a plurality of vehicles and a plurality of drivers,
   wherein the qualifying allocation score is computed based upon a linear weighted summation of a qualifying driver score and a qualifying vehicle score for the respective road segments;
      automatically allocate an entity from the plurality of entities to a subsequent route by selecting, from among the plurality of entities, an entity comprising a driver and a vehicle having a respective qualifying allocation score that satisfies a predetermined condition; and
      control navigation of the vehicle along the subsequent route based on the allocation of the entity to the subsequent route.

2. The computing device of claim 1, wherein the RCS computed for the respective road segments comprises (i) a static RCS component based upon a road type of the respective road segments, and (ii) a dynamic RCS component that is based upon driving conditions associated with the respective road segments when driven by the vehicle.

3. The computing device of claim 2, wherein the RCS computed for the respective road segments is computed as a ratio of the dynamic RCS component to the static RCS component for the respective road segments.

4. The computing device of claim 2, wherein the static RCS component for the respective road segments is computed based upon historical drive assist alerts, road incline/descent information, camera information, map data, or accident counts.

5. The computing device of claim 2, wherein the dynamic RCS component for the respective road segments is computed based upon (i) drive assist alerts of other vehicles at a time interval that matches that driven by the vehicle on the respective road segment, (ii) weather information, or (iii) traffic density.

6. A non-transitory computer-readable medium having instructions stored thereon that, when executed by processing circuitry of a computing device, cause the computing device to:

while navigating a driving environment, receive, via one or more wireless links in accordance with a communication protocol, data from a vehicle of a route comprising a plurality of road segments, the data comprising (i) environment-based data, and (ii) drive assist alerts, wherein the environment-based data is acquired from onboard vehicle sensors of the vehicle, and the drive assist alerts are generated by an Advanced Driver Assistance System (ADAS) of the vehicle, wherein the data is stored in a database and collected over time from a plurality of vehicles while navigating a region including the route;

compute, from the data, a road complexity score (RCS) for respective road segments of the plurality of road segments;

periodically compute, for one or more of a plurality of entities as based on aggregated data received from the plurality of vehicles over time, a qualifying allocation score for the route as new data is received from the plurality of vehicles and stored in the database, the qualifying allocation score for the route being based upon a summation of per road segment qualifying allocation scores computed for the respective road segments, wherein the per road segment qualifying allocation scores are computed based upon the RCS computed for the respective road segments, wherein the plurality of entities comprise a plurality of vehicles and a plurality of drivers, wherein the qualifying allocation score is computed based upon a linear weighted summation of a qualifying driver score and a qualifying vehicle score for the respective road segments; and automatically allocate an entity from the plurality of entities to a subsequent route by selecting, from among the plurality of entities, an entity comprising a driver and a vehicle having a respective qualifying allocation score that satisfies a predetermined condition; and control navigation of the vehicle along the subsequent route based on the allocation of the entity to the subsequent route.

7. The non-transitory computer-readable medium of claim 6, wherein the RCS computed for the respective road segments comprises (i) a static RCS component based upon a road type of the respective road segments, and (ii) a dynamic RCS component that is based upon driving conditions associated with the respective road segments when driven by the vehicle.

8. The non-transitory computer-readable medium of claim 7, wherein the RCS computed for the respective road segments is computed as a ratio of the dynamic RCS component to the static RCS component for the respective road segments.

9. The non-transitory computer-readable medium of claim 7, wherein the static RCS component for the respective road segments is computed based upon historical drive assist alerts, road incline/descent information, camera information, map data, or accident counts.

10. The non-transitory computer-readable medium of claim 7, wherein the dynamic RCS component for the respective road segments is computed based upon (i) drive assist alerts of other vehicles at a time interval that matches that driven by the vehicle on the respective road segment, (ii) weather information, or (iii) traffic density.

11. A computing device, comprising:
a memory configured to store computer-readable instructions; and
a processor configured to execute the computer-readable instructions stored in the memory to cause the computing device to:

while navigating a driving environment, receive, via one or more wireless links in accordance with a communication protocol, data from an agent of a route comprising a plurality of navigation segments, wherein the data is acquired from onboard sensors of the agent, wherein the data is stored in a database and collected over time from a plurality of agents while navigating a region including the route;

compute, from the data, a complexity score (CS) for respective navigation segments of the plurality of navigation segments;

periodically compute, for one or more of a plurality of entities based on aggregated data received from the plurality of agents over time, a qualifying allocation score for the route as new data is received from the plurality of agents and stored in the database, the qualifying allocation score for the route being based upon a summation of per navigation segment qualifying allocation scores computed for the respective navigation segments, wherein the per navigation segment qualifying allocation scores are computed based upon the CS computed for the respective navigation segments, wherein the plurality of entities comprise a plurality of vehicles and a plurality of drivers, wherein the qualifying allocation score is computed based upon a linear weighted summation of a qualifying driver score and a qualifying vehicle score for the respective navigation segments; and automatically allocate an entity from the plurality of entities to a subsequent route by selecting, from among the plurality of entities, an entity comprising a driver and a vehicle having a respective qualifying allocation score that satisfies a predetermined condition; and control navigation of the agent along the subsequent route based on the allocation of the entity to the subsequent route.

12. The computing device of claim 11, wherein the CS computed for the respective navigation segments comprises (i) a static CS component based upon a type of the respective navigation segments, and (ii) a dynamic CS component that is based upon conditions associated with the respective navigation segments when driven by the agent.

13. The computing device of claim 12, wherein the CS computed for the respective navigation segments is computed as a ratio of the dynamic CS component to the static CS component for the respective navigation segments.

14. The computing device of claim 12, wherein the static CS component for the respective navigation segments is computed based upon historical alerts, camera information, or map data.

15. The computing device of claim 12, wherein the dynamic CS component for the respective navigation segments is computed based upon alerts of other agents at a time interval that matches that of the agent on the respective navigation segment.

16. The computing device of claim 1,
wherein the RCS is computed using a per road segment weighting for the respective road segments by weighting a component of the RCS for the respective road segments based upon a type of the vehicle.

17. The computing device of claim 1, wherein the processor is configured to execute the computer-readable instructions stored in the memory to cause the computing device to determine, based upon a ranking of the plurality of entities by respective qualifying allocation scores, the entity from the plurality of entities to automatically allocate to the subsequent route by selecting, from among the ranking of the plurality of entities, the entity having a respective qualifying allocation score that satisfies the predetermined condition with respect to the ranking of the plurality of entities.

18. The computing device of claim 17, wherein the entity having the respective qualifying allocation score that satisfies the predetermined condition with respect to the ranking of the plurality of entities comprises an entity having a highest qualifying allocation score from among the ranking of the plurality of entities.

19. The computing device of claim 1, wherein the linear weighted summation of the qualifying driver score and the qualifying vehicle score is based upon a frequency in which the driver and the vehicle are allocated to different routes.

20. The computing device of claim 1, wherein the subsequent route is different than the route driven by the vehicle and used to calculate the qualifying allocation score.

\* \* \* \* \*